United States Patent
Tu et al.

(10) Patent No.: US 10,236,928 B2
(45) Date of Patent: Mar. 19, 2019

(54) MOLDED MOBILE DEVICE CASE WITH STORAGE COMPARTMENT HAVING HINGED ACCESS

(71) Applicant: Incipio, LLC, Irvine, CA (US)

(72) Inventors: Peter Tu, Long Beach, CA (US); Timothy Hemesath, Clovis, CA (US)

(73) Assignee: Incipio, LLC, Irvine, CA (US)

( * ) Notice: Subject to any disclaimer, the term of this patent is extended or adjusted under 35 U.S.C. 154(b) by 0 days.

(21) Appl. No.: 15/295,316

(22) Filed: Oct. 17, 2016

(65) Prior Publication Data

US 2017/0194997 A1    Jul. 6, 2017

Related U.S. Application Data

(60) Provisional application No. 62/274,567, filed on Jan. 4, 2016.

(51) Int. Cl.
*H04B 1/3888* (2015.01)

(52) U.S. Cl.
CPC ................... *H04B 1/3888* (2013.01)

(58) Field of Classification Search
CPC .... H04B 1/3888; H02J 7/0044; H02J 7/0047; H02J 7/0054; H02J 2007/005; H02J 2007/0062; H02J 2007/0096
USPC ....... 455/575.8, 575.1; 320/115; 361/679.56, 361/679.41
See application file for complete search history.

(56) References Cited

U.S. PATENT DOCUMENTS

| | | | |
|---|---|---|---|
| D649,144 S | 11/2011 | Fathollahi | |
| 8,047,364 B2 | 11/2011 | Longinotti-Buitoni | |
| 8,381,904 B1 | 2/2013 | Longinotti-Buitoni | |
| 8,390,255 B1 * | 3/2013 | Fathollahi | H02J 7/0045 206/308.3 |
| D700,598 S | 3/2014 | Kim | |
| 8,706,176 B1 * | 4/2014 | Jia | H04M 1/185 206/305 |
| 8,757,376 B2 | 6/2014 | Azzoni | |
| D717,776 S | 11/2014 | Hemesath | |
| 9,136,897 B2 * | 9/2015 | Hynecek | H04B 1/3888 |
| 2010/0224519 A1 | 9/2010 | Kao | |
| 2011/0284407 A1 | 11/2011 | Connolly | |
| 2013/0292269 A1 * | 11/2013 | Tages | A45C 11/00 206/37 |
| 2015/0068934 A1 * | 3/2015 | Armstrong | A45C 11/00 206/320 |
| 2015/0136621 A1 * | 5/2015 | Lebauer | B65D 81/02 206/216 |

* cited by examiner

*Primary Examiner* — Nay A Maung
*Assistant Examiner* — Angelica M Perez
(74) *Attorney, Agent, or Firm* — Manatt, Phelps & Phillips, LLP

(57) ABSTRACT

A protective case for a mobile device having a molded multi-layered construction is disclosed. The case includes a mobile device cavity that is configured to receive and retain the mobile device and a storage cavity that extends internally from an upper portion of the case to a lower portion of the case. The lower and upper portions of the case are hinged to one another to facilitate access to the storage compartment. The exterior back surface of the case is configured to conceal the existence of the storage compartment. Other and various unique aspects relating to the construction, configuration and manufacture of the case are disclosed.

20 Claims, 20 Drawing Sheets

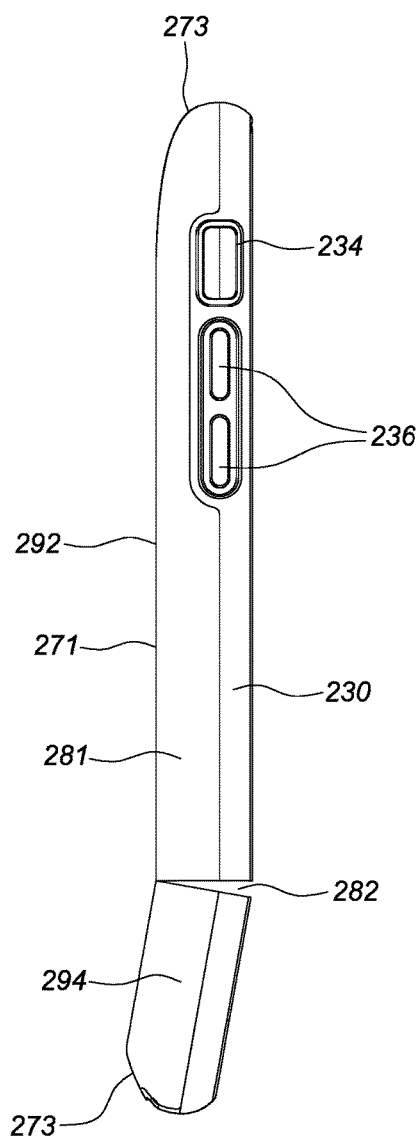 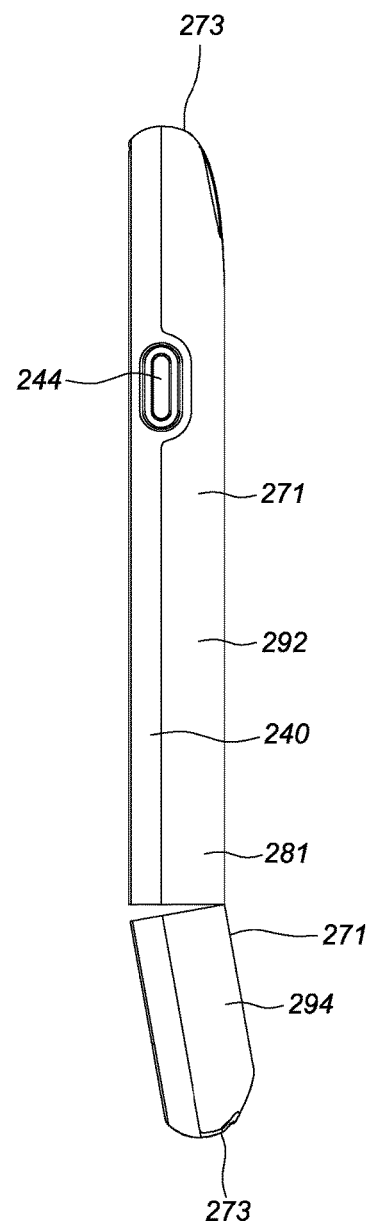
FIG. 3C     FIG. 3D

MOLDED MOBILE DEVICE CASE WITH STORAGE COMPARTMENT HAVING HINGED ACCESS

INCORPORATION BY REFERENCE TO RELATED APPLICATIONS

This application claims benefit under 35 U.S.C. § 119(e) from U.S. Provisional Application No. 62/274,567, filed on Jan. 4, 2016, which is hereby incorporated by reference in its entirety.

BACKGROUND OF THE INVENTION

Field of the Invention

This patent document relates to user removable protective enclosures or cases for mobile devices and more particularly to such cases that have a credit card or storage compartment.

Description of the Related Art

Mobile devices, such as smart phones, tablets, laptops and the like are known to sustain damage from impact and from contamination as a result of ingress of water or other fluid. The damage, for example, may result in a cracked screen, scratches on a finished surface, lost or damaged buttons or controls, cracked or bent external body components, and/or failed or malfunctioning electrical components. Protective cases can protect mobile devices from such and variant types of damage.

While some protective cases for mobile devices include storage compartments, such cases often are bulky, accentuate the shape and existence of the compartment and lack durability. They can also include panels and drawers that can be relatively difficult or costly to manufacture. Accordingly, the inventors here have found that the configuration, construction and assembly of such cases may be improved upon as described herein.

SUMMARY OF THE INVENTION

There exists a continuing need for new and improved protective cases for mobile devices that provide high level of protection while also providing a concealed storage compartment.

Disclosed are numerous aspects of unique and inventive protective cases configured to receive, retain, and protect a mobile device. Such mobile devices generally include flat front and back faces that define the height or thickness of the mobile device and a perimeter defined by sides extending between the front and back faces on the top, bottom, right and left sides of the mobile device, so as to define corners at the intersecting regions of the sides. The case may be configured for a mobile device that is in the form of a tablet, a mobile phone, an MP3 audio player, a gaming device, or other portable handheld electronic device. Various aspects of the structure, construction, configuration, use and manufacture of the case are summarized below.

The case may be formed of a molded integrated construction that defines the interior and exterior surfaces of the case, front and opposing back face walls of the case, and left, right, bottom and top side walls of the case. The interior surface of the front face wall is configured to be in contact with and extend over the perimeter edge of the front face of the mobile device when the mobile device is fully received within the case so as to retain the mobile device within the case. The interior surface of the back face wall is configured to be in contact with the back face of the mobile device and cover the back of the device and the interior surfaces of the sidewalls are configured to be in contact and protect the corresponding sides of the mobile device.

The interior surface, of the walls of the case, thus defines a mobile device compartment or cavity that is configured to receive and retain the mobile device within the case. The interior surface also defines a storage compartment that may be formed into the back face wall of the case. The storage compartment may be dimensioned to receive credit cards or the like and may open, partially or entirely, into the mobile device compartment/cavity.

The back face wall of the case includes a flat exterior surface region that extends along a first plane and a perimeter exterior surface region that extends around that flat exterior surface region. The flat exterior surface region of the back face wall is configured so as to not extend to the perimeter of the mobile device. Rather, the perimeter surface region includes a transition surface that is configured to extend from the external flat surface to the intersection between the back face of the device and the top, bottom, right and/or left sides of the mobile device. The transition surface extends away from the plane that defines the flat exterior surface region toward the front face wall of the case and does not include surfaces that are parallel to the flat exterior surface. The storage compartment residing thereunder is thereby capable of being concealed by the exterior shape of the back face wall.

The case includes an upper portion and a lower portion, which is hinged at the back face wall to the upper portion. The lower portion is smaller than the upper portion and is integrally coupled to the upper portion at the hinge but disconnected from the upper portion at the sidewalls. The disconnection between the upper and lower portions may be imparted by the molding process or may be mechanically imparted after molding during the finishing process by mechanical or laser cutting or other suitable process.

The upper and lower portions and hinge are configured to allow the lower portion to rotate backward over the exterior surface of the back face wall of the upper portion of the case but limit forward rotation. When the lower portion is rotated backwards, the storage compartment becomes accessible to the user. The flat exterior surface and surrounding transition surface may extend to both the upper and lower portions of the case and is defined by the exterior surface of the back face wall on each of those portions.

Both the upper and lower portions of the case may be formed of a relatively rigid first layer and a relatively less rigid (or softer) second layer co-molded to the more rigid first layer. Thus, for example, the second layer may be formed of thermoplastic urethane (TPU), thermoplastic elastomer (TPE), silicone, and/or natural or synthetic rubber or the like while the first layer may be formed of a more rigid polycarbonate (PC), acrylonitrile butadiene styrene (ABS), fiber reinforced plastic, and/or metal or the like.

Alternatively, the upper portion may be formed of the relatively rigid first layer co-molded to the relatively less rigid second layer and the lower portion may be formed without the relatively rigid first layer.

The first layer may be made of a first material that has a first hardness and the second layer may be made of a second material that has a second hardness that is greater than the first hardness. For example, the first layer may have a Shore A durometer hardness that is 40% or more greater than the second layer, 30% or more greater than the second layer, 20% or more greater than the second layer, or 10% or more greater than the second layer all +/−5% as measured using the American Society for Testing and Materials (ASTM) standard D2240.

The second layer may further form buttons that are configured to reside over control buttons of the mobile device and may also form the hinge that connects the upper portion and lower portion together. The second layer may also form the some or all of the interior surface of the case including the device and storage compartment. The second more flexible layer is further configured to form the front face wall of the case, the interior regions of the side walls of the case and the upper regions exterior regions of the sidewalls of the case to allow for greater flexibility in the case, which can facilitate insertion and removal of the device into and out of the case.

The interior surface of the case, formed by said second layer, may include a pattern of elevated walls that define apertures capable of providing additional impact zones and hence added protection to the device should the case be dropped. The pattern of elevated interconnected walls may be comprised of any arrangement of shapes selected, for example, from a group consisting of a square, octagon, pentagon, rectangle, triangle, circle, hexagon and heptagon or combination thereof. By way of example, the interconnected walls may be comprised of walls that form hexagons or portions thereof, which together create a honeycomb wall pattern.

The pattern of elevated interconnected walls may be contiguous or discontiguous, may or may not extend to the perimeter regions of the second layer or interior surfaces of the case, may be positioned in discrete regions, or may be grouped and spaced apart from one another in one or more discrete regions. Various patterns comprising one or more shapes may be employed alone or in combination with other patterns, such that one region of the inner surface of the second layer may have one pattern and another region of the inner surface of the second layer may have another pattern.

The first layer may form the flat exterior surface region of the back face wall of the case on both the upper and lower portions of the case. The first layer may also form the perimeter region including the transition surface of the back face wall of the case on both the upper and lower portions of the case. Alternatively, the lower portion, including the flat exterior surface and transition surface extending therefrom, may be formed without the first layer or solely by the second less rigid layer. An additional decorative third layer may be overlaid to form the external surface of one or both of the upper and lower portions to provide additional flexibility in achieving the desired finish. For example, the third layer may be an in-mold-labeling (IML) layer that is textured and/or colored with patterns or graphics to provide a desired finish such as the look of leather or metal or other desired finish.

Apertures may be formed in the second layer and a plurality of protrusions may be formed in the first layer that mate within the apertures formed in the second layer and thereby may provide greater integration between the layers.

The case may also include one or more apertures that extend through one or more walls of the case to allow for functionality and facilitate the intended use of the mobile device. For example, the back face wall may include a camera lens aperture that extends there through and is configured to extend around the outside of a camera lens window on the back face of the mobile device. Similarly, one or more of the side walls may include an aperture to allow for manipulation of switches or access to electrical ports or connector on the mobile device.

Methods of manufacturing a protective case that includes one or more of the various foregoing aspects are also encompassed herein. Manufacturing steps for a case may, for example, include: (1) molding a first rigid layer in a mold that is configured to define the exterior shape of a first layer, the first layer comprising a back wall and sidewalls of only an upper portion of the case or of both an upper and lower portion of the case; (2) co-molding a second softer layer to the first rigid layer in a mold that is configured to define the exterior shape of the second layer, the second softer layer forming a hinge component between the upper and lower portion of the case and comprising the interior surfaces of both the back wall and sidewalls of both the upper and lower portion of the case; (3) imparting a separation between the upper portion and lower portion of the case by molding and/or mechanically cutting the walls between the upper and lower portions adjacent to opposing ends of the hinge. The exterior configuration and construction of the case and components thereof as described above and elsewhere in the written specification and drawings may be further incorporated into the foregoing manufacturing and molding process. Also, the case may be removed from the mold and finished with a latex based outer coating such as those marketed as Soft-Touch coatings or other lipophobic or oleophobic coatings to mitigate against fingerprints and provide a desirable feel to the user.

In operation the mobile device is inserted into the case. Insertion may be facilitated either directly through the more flexible front face wall or by rotating the lower portion backward about the hinge and sliding the mobile device into the case and then rotating and fitting the lower portion about the bottom end region of the inserted mobile device. Rotating the hinge backward also allows access to the storage compartment concealed in the back face wall, such that credit cards or the like can be slid in and out through the hinged lower portion, which effectively serves as a door to the storage compartment. The shape of the exterior of the case including the back wall of the case is configured to mitigate against accentuating the existence of the storage compartment so that the storage compartment is less noticeable by others. Valuable items such as credit cards held in the storage compartment may therefore be more secure should the case and mobile device contained therein be lost or stolen.

In addition, the case is capable of being charging dock friendly. Rotating the lower portion 294 of the case backward along allows for the lower portion 294 of the mobile device 100 (e.g., where the charging and data ports are located) to be directly inserted into a docking or charging cradle without totally removing from the case from the mobile device. Moreover, the large aperture 266 configuration on case 200 is capable of providing a low profile fit at the bottom end of the case and thereby allows a better fit within the cavity of the docking or charging cradle that may allow the mobile device 100 to fit and functionally dock/charge within the cradle without removal of the case or rotation of the lower portion 294 of the case.

Each of the foregoing and various aspects, together with those set forth in the claims and summarized above or otherwise disclosed herein, including the drawings, may be combined to form claims for a device, apparatus, system, method of manufacture, and/or use without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIGS. 3A-3F are front face, back face, left side, right side, top side and bottom side views of the protective case of FIG. 2 that provide additional views of the structure and construction of the case from each side.

Figure 1A:
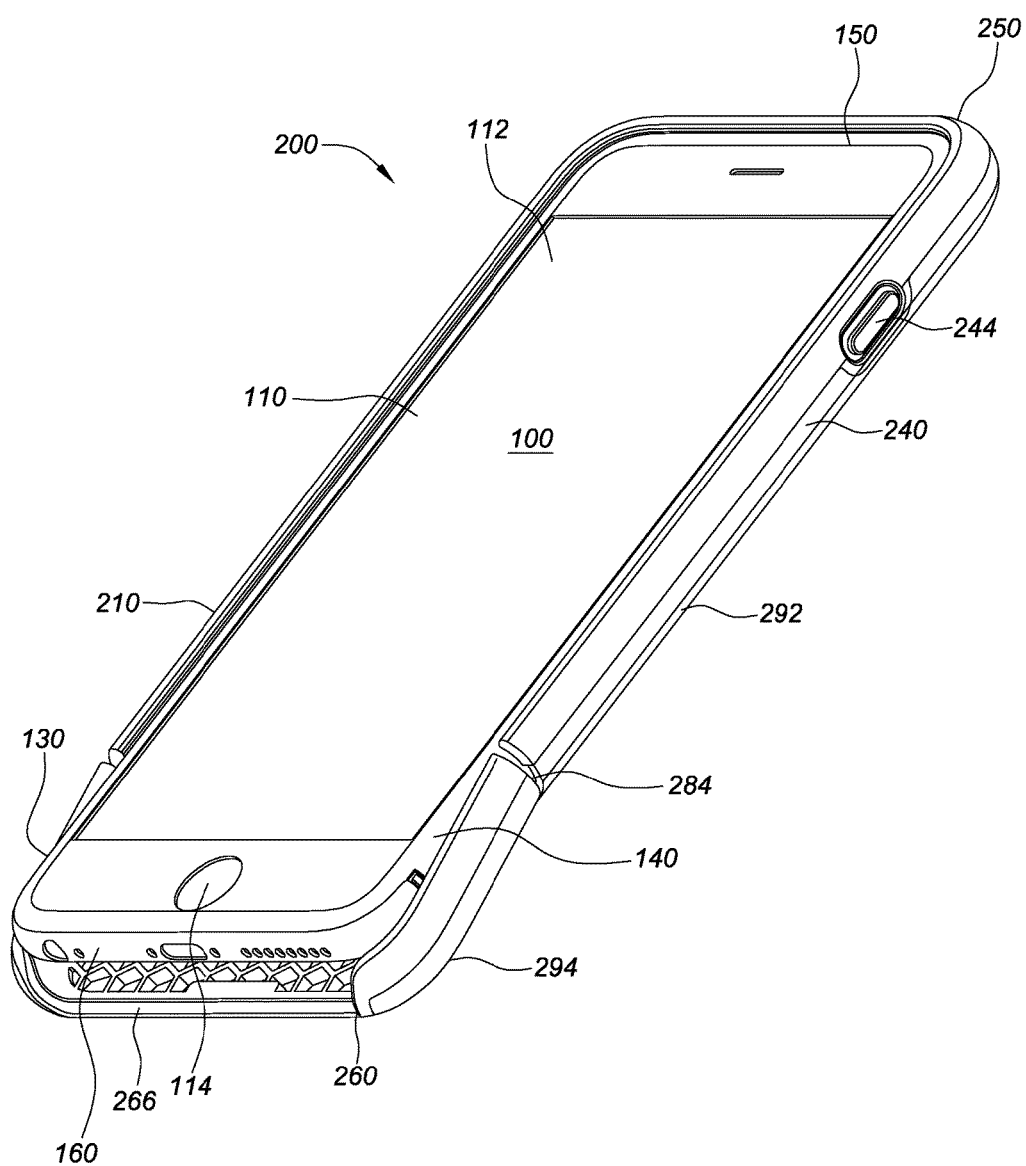
FIGS. 1A and 1B are front and rear perspective views, respectively, of a protective case for a mobile device with the mobile device received within the case and the lower portion partially rotated backward relative to the upper portion along the hinge between the upper and lower portions. The mobile device depicted, for which the illustrated embodiment of the case is particularly configured to receive, is an Apple iPhone 6® mobile phone.
Figure 1B:
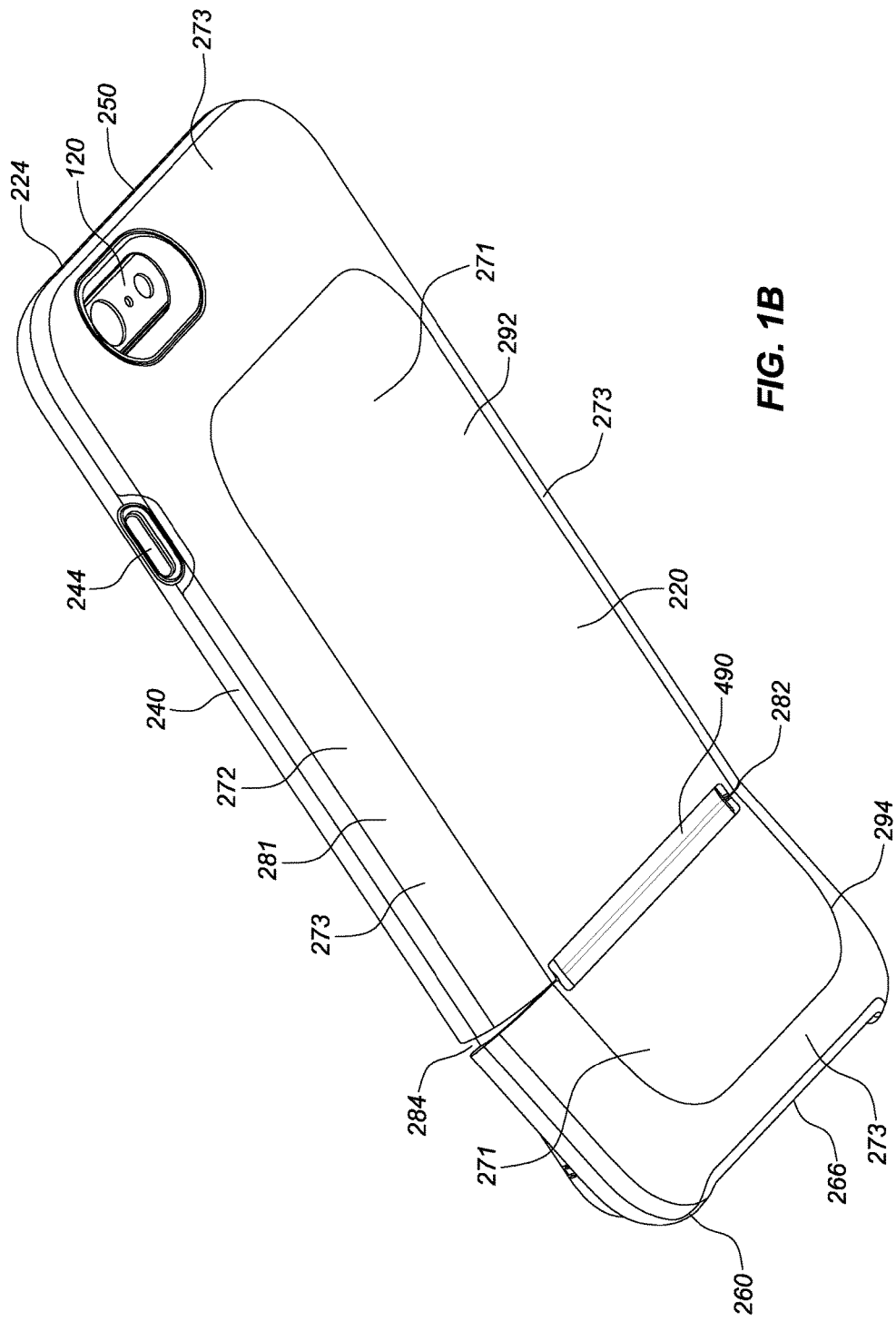
Figure 2:
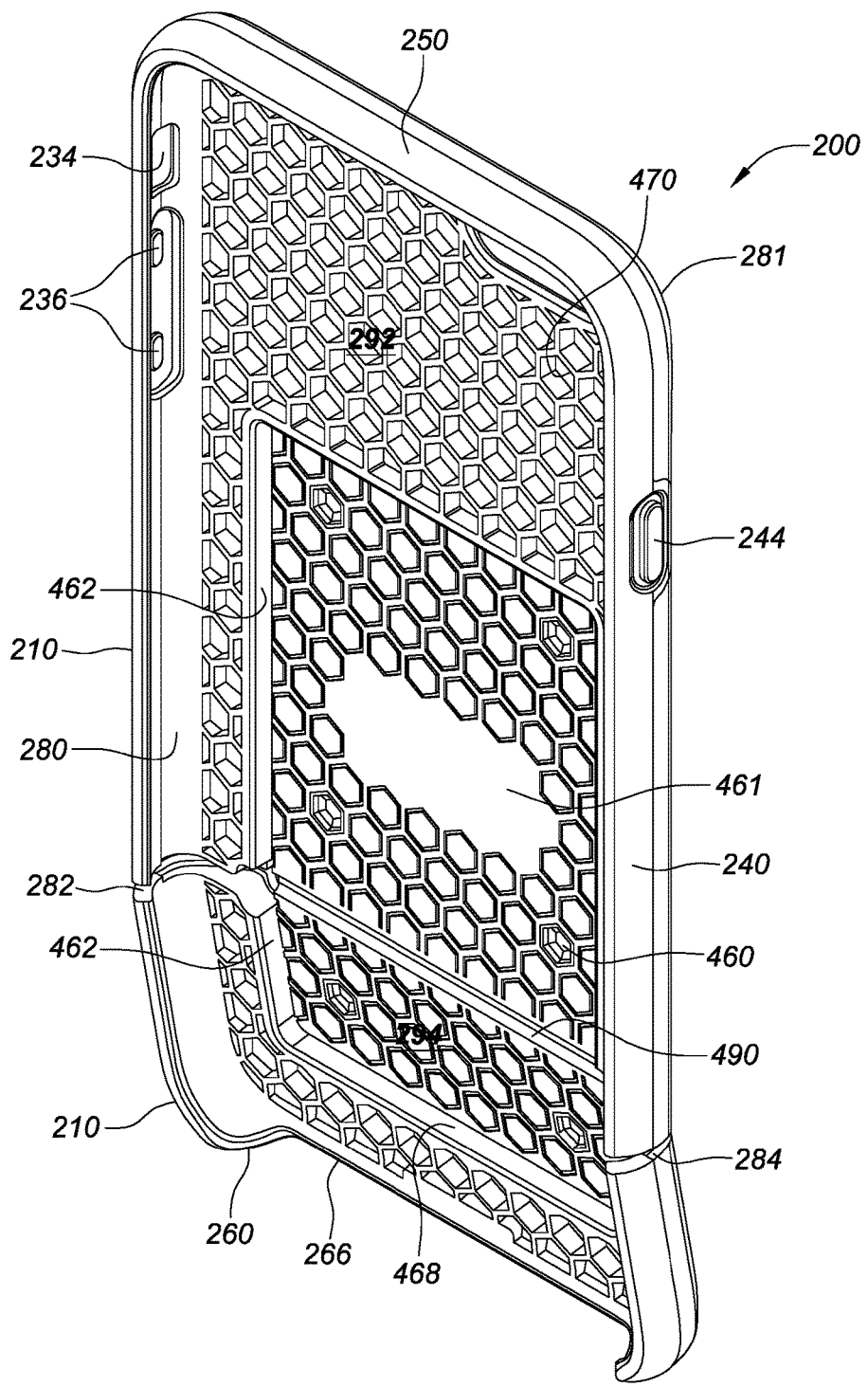
FIG. 2 is a perspective view of a protective case of FIG. 1 with the mobile device removed from the case to allow greater visibility into the construction and interior surface that defines the device cavity or compartment and the storage cavity residing underneath.
Figure 3A:
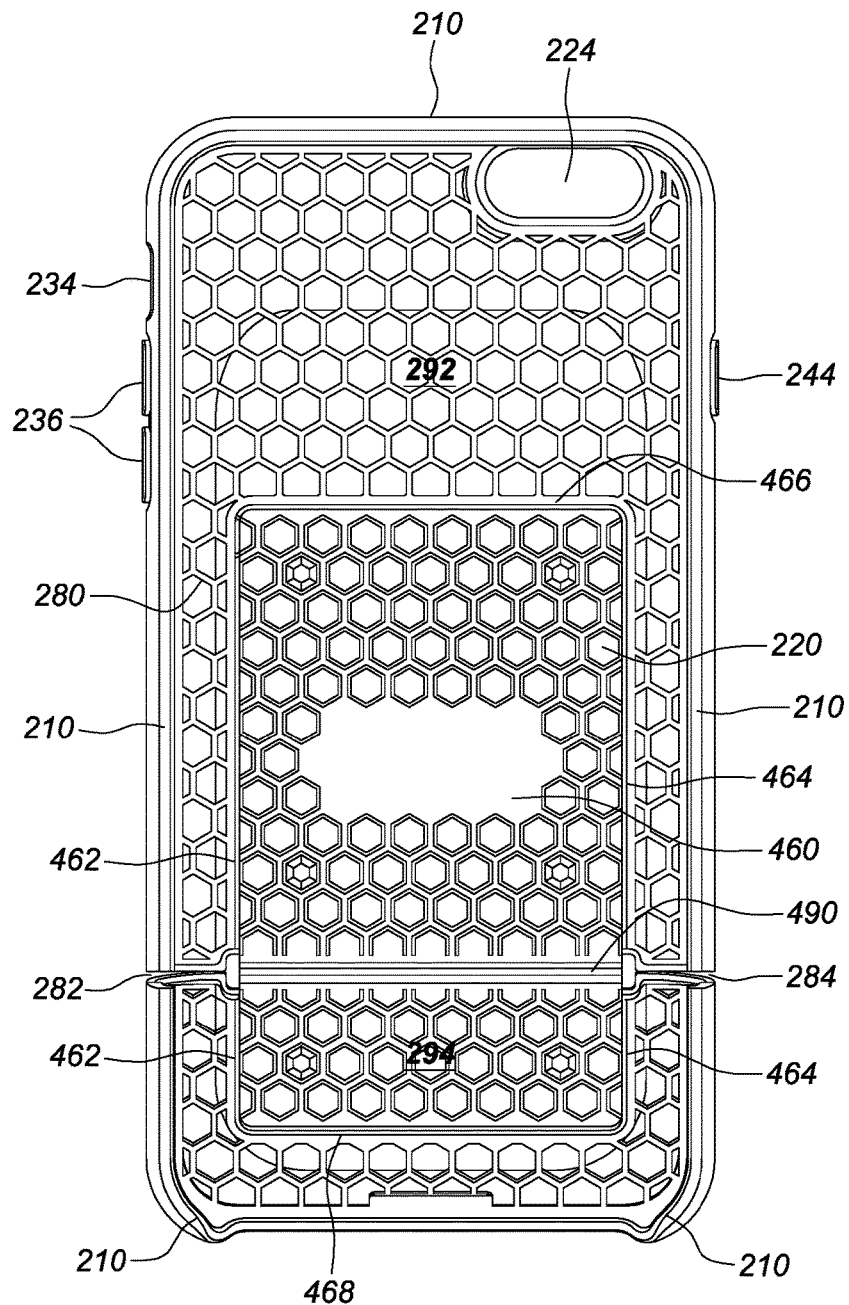
Figure 3B:
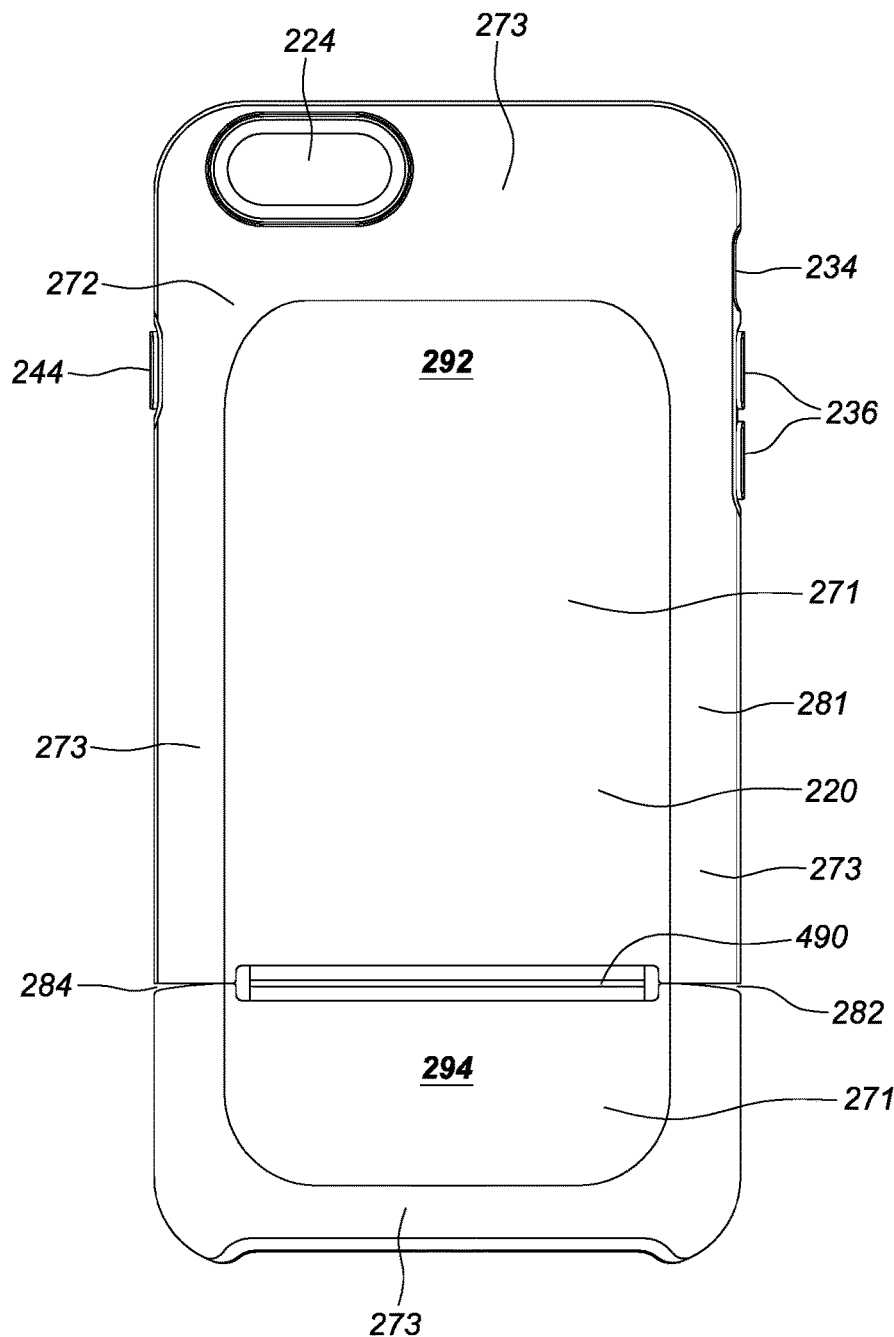
Figure 3E:
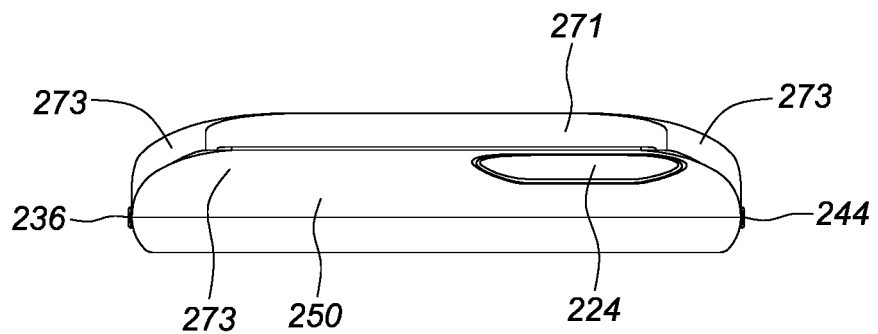
Figure 3F:
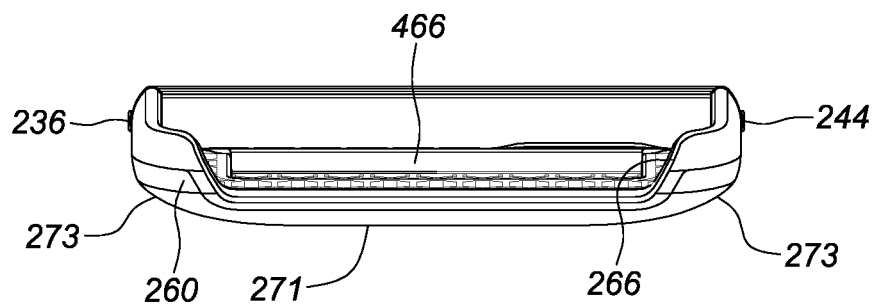

Each drawing is generally to scale and hence relative dimensions of the various layers can be determined from the drawings.

DETAILED DESCRIPTION OF THE PREFERRED EMBODIMENT

As summarized above and illustrated in the drawings, disclosed herein are various aspects of a protective case for a mobile device capable of minimizing bulkiness and weight, yet maintain a high level of protection. Many of those aspects are summarized above and illustrated in the drawings.

Commonly disclosed in FIGS. 1-12 are protective enclosures or cases 200 and 500 for a mobile device 100 that illustrate, by way of example, various configuration and construction aspects. Each case is configured for an Apple iPhone 6 mobile or smart phone device. It should be understood, however, that the case may be configured for any mobile device or electronic device, including but not limited to other portable or cellular phones, PDAs, gaming devices, laptop computers or tablet devices. A first implementation of the protective case 200 is illustrated in FIGS. 1-5 and a second implementation of the protective case 500 is illustrated in FIGS. 6-12. Common or corresponding elements of each case implementation are referred to using the same reference numerals.

As best depicted in FIGS. 1A-1B and 6A-6B, the mobile device 100 includes generally flat front and back faces 110, 120, and sides (a left side 130, a right side 140, a top side 150, and a bottom side 160) that extend between the front and back faces and define the perimeter of the mobile device 100. The front face includes a touchscreen 112 and a home button or control button 114. The device also includes volume buttons, mute switch on the left side, a power button on the right side, a camera and flash on the back face and user interface ports (e.g., power, audio connections) and microphone and/or speaker grill on the bottom side.

Generally, as depicted in the drawings FIGS. 1-12, the protective cases 200 and 500 each include a front face wall 210, back face wall 220, left side wall 230, right side wall 240, top side wall 250, and bottom side wall 260, which together define the interior and exterior surfaces 280, 281 of the cases. The side walls, 230, 240, 250, 260 reside between the front and back face walls and are internally configured and dimensioned to correspond in dimension and external configuration of the front, back, left, right, top and bottom sides 110, 120, 130, 140, 150, 160 of the mobile device 100, respectively. The interior surface 280 of the case walls, thus, define a mobile device cavity 470 that is configured to be in contact with each side and face of the mobile device 100 and receive and retain the mobile device 100 with the cavity 470. The interior surface 280 of the case walls also defines an additional storage compartment 460. The opposing exterior surface 281 defines the case's outer shape.

Each of the cases includes an upper portion 292 and a lower portion 294. The lower and upper portions are separated at gaps 282, 284 at the left and right side walls 130, 140 and integrally connected to one another by a living hinge 490 at the back face wall. The hinge 490 is constructed and configured to allow the lower portion 294 to be rotated backward over the exterior surface of the back face wall 220 of the upper portion 292, so that the exterior surfaces of the back face walls of the lower and upper portions 294, 292 can rotate towards facing one another. The opposing surfaces at the gaps 282, 284 in the left and right side walls 230, 240 of the upper and lower portions 292, 294 of case limit forward rotation between the upper and lower portions 292, 294 of the case.

Various configuration aspects of each of the walls of the case are further discussed. Each of the walls in the illustrated implementations include control buttons and/or apertures formed therein. It should be understood however, that the number of buttons and apertures can vary (increase or decrease) and their shape and placement vary to correspond with controls on the mobile device for which the case is configured for. In the present implementations, the side walls of the case have a generally convex (case 200) or flat (case 500) exterior surface 281 and a concave interior surface 280, which corresponds to the curved exterior shape of the sides of the mobile device 100.

The left side wall 230 includes volume control buttons 236 that are positioned, dimensioned, configured and adapted to interface and actuate the volume control buttons on the mobile device 100. Also included in the left side wall 230 is an opening or aperture 234 that is positioned and dimensioned to correspond with the ringer silent switch of the mobile device 100 to provide functional user access to the switch. The right side wall 240 includes a mobile device power button 244 positioned, dimensioned, configured, and adapted to interface with the power button on the mobile device 100. The top side wall 250 in the illustrated embodiment does not include buttons or apertures, but include either apertures and/or buttons to provide access or control over corresponding ports or buttons on the mobile device should the device have controls or ports on that side. The bottom side wall 260 may have one or more apertures 266 that are positioned and dimensioned to correspond with, for example, the headphone jack port and the data and charging port of the mobile device.

The front face wall 210 is configured to extend around the perimeter region of the front face 110 of the mobile device 100 with the interior surface 280 of the front face wall being configured to be in contact with the front face 110 of the mobile device 100. The interior surface 280 of the front face wall 210 may be flat or may have undulations that create multiple spaced apart contact surfaces between the interior surface of the front face wall 210 and the front face 110 of the mobile device 100. The front face wall 210 may be configured to extend around the entire perimeter of the front face 110 of the mobile device 100 such in the implementation illustrated in FIGS. 6-12 or may be configured to extend partially around the front face 110 of the mobile device 100 such as in the implementation illustrated in FIG. 1-5, which does not include a front face wall 210 in regions corresponding to the lower end regions of the mobile device 100.

The exterior surface 281 of the front face wall 210 may have a uniform or non-uniform shape and may have a flat, concave and/or convex in external appearance. In the illustrated implementations, the exterior surface 281 of the front face wall is slightly convex in configuration, which provides additional front face bumper type protection should the mobile device be dropped on its face. Regions of the front face wall 210 may be convex and other regions may be flat and/or concave. The front face wall 210 may be solid or may be hollow and/or contain grooves extending parallel with or perpendicular or at other angles with the longitudinal length of the front face wall 210 in one or more regions, which may provide additional impact absorption zones.

The back face wall 220 is configured to extend around the perimeter region of the back face 120 of the mobile device 100 and includes a camera lens and flash opening 224. The interior surface 280 of the back face wall 220 includes a storage compartment 460 defined therein by left, right, top and bottom side or boundary walls 462, 464, 466, 468 and back boundary wall 461, which in the illustrated implementations is rectangular in shape and dimensioned in height to be capable of receiving multiple credit cards stacked on top of one another. It should be understood that the storage compartment 460 may be differently shaped and dimensioned.

In the illustrated implementations, the storage compartment 460 extends across both the upper and lower portions 292, 294 of the interior surface 280 of the case. It should be understood, however, that the storage compartment 460 could be dimensioned and/or positioned to reside only in the upper or lower portions 292, 294 of the case. It should also be understood that multiple storage compartments 460 may be included with one or more of which residing in the lower portion 294 and/or one or more separate compartment residing in the upper portion 292. Additional storage compartment boundary walls may be formed in the back face wall 220 to separate one storage compartment from another.

The storage compartment 460 in the drawings is configured to open into the larger mobile device cavity 470 that is defined by the upper region of the interior surface 280 of the case residing there-above. In the illustrated implementations, the boundary walls 462, 464, 466, 468 extend directly into the mobile device cavity 470 to provide maximum height/volume in the storage compartment 460. It should be understood however, that a top boundary wall, spaced apart and generally opposing the back boundary wall 461, may be included to further partition the storage compartment 460 from the mobile device cavity 470. In such a configuration, the top boundary wall may extend across the top of the entire storage compartment 460 or may extend only partially across the top of the storage compartment 460. For example, the top boundary wall, may extend into the storage compartment 460 along the perimeter (or regions of the perimeter) of one or more or all of the boundary walls 462, 464, 466, and/or 468 to form a retention lip that can assist in maintaining the credit cards or stored items within the storage compartment 460 of the case even when the mobile device 100 is not in the case.

As best illustrated in FIGS. 1B, 3B-F and 5 with respect to the case 200 and FIGS. 6B, 8B-F and 11-12, with respect to the case 500, the exterior surface 281 of the back face wall 220 includes a flat exterior surface region 272 that extends along a first plane and a perimeter exterior surface 272 region that extends around that flat exterior surface region 272. The flat exterior surface region 272 of the back face wall 220 is configured to terminate within the boundaries of the perimeter of the back face 120 of the mobile device 100 on all or at least some of the sides 130, 140, 150, 160 of the mobile device 100. Rather, the perimeter surface region 272 includes a transition surface 272 that is configured to extend from the external flat surface 271 above the back face 120 of the mobile device to the intersection between the back face 120 of the mobile device 100 and the top, bottom, right and/or left sides 150, 160, 140, 130 of the mobile device 100. The transition surface 273 extends away from the plane that defines the flat exterior surface region 271 and toward the front face wall 210 of the case. The transition surface 273 is configured to be curved or curvilinear so as to preferably not include surfaces that are parallel to the flat exterior surface 271. The flat exterior surface 271 is configured to extend beyond the underlying perimeter boundary walls that define the storage compartment 460.

In the illustrated embodiment, the flat exterior surface 271 extends outwardly beyond both the top and bottom boundary walls 466 and 468 that define the top and bottom of the storage compartment 460. The flat surface region 271, thus, does not correspond in dimension with the back wall boundary 461 of the storage compartment 460. In the illustrated embodiments, the flat surface region 271 extends beyond the perimeter of the back wall boundary 461 of the storage compartment 460 in both the top and bottom direction, however, it should be understood that the flat surface region 271 may extend beyond the underlying perimeter of the back wall boundary 461 of the storage compartment 460 in less than two directions or in all or more than two directions.

Alternatively, depending on the size of the storage compartment 460 and the external dimensions of the case, the flat surface region 271 may not extend beyond the perimeter of the back wall boundary 461 in one or more directions (e.g., in the direction of the top, bottom, right or left sides).

By configuring the external surface of the back face wall 220 in the foregoing manner, the storage compartment 460 residing thereunder is not mirrored into or otherwise accentuated in the exterior surface 281. The existence of the storage compartment is thereby capable of being better concealed by the exterior shape of the back face wall and the continuous curved transition surface 273 into the side walls of the case. Valuable items such as credit cards held in the storage compartment may therefore be more secure should the case and mobile device contained therein be lost or stolen.

The transition surface region 273 may have a uniform contour around the entire perimeter of the case as, for example, illustrated in FIGS. 6-12, or may be differently contoured at different regions of the case, as, for example, illustrated in FIGS. 1-5. Thus, the contour of the transition surface region 273 on the left and right side regions of the case, may be the same or different from one another and/or the same or different from the transition surface region 273 on the top or bottom regions of the case. Notably, the transition surface region 273 may be configured to extend on one or more side regions in an area that is configured to reside within the boundaries of the flat back face 120 of the mobile device.

In the implementation illustrated in FIGS. 1-5, the transition surface 273 begins relatively further inward from the perimeter of the case on the top end region as compared to the left and right side regions and the bottom end region. The slope of the transition surface 273 along the top end region (the side with the camera lens opening 224) is more gradual than the slope on the other sides. The transition surface 273 at the left and right side regions and the bottom end region have generally the same slope or pitch, which is less gradual (more steep) than the transition surface 273 at the top end region. The variations in the slope of pitch of the transition surfaces 273 are best seen in FIGS. 1B, 3B-F, and 5. Notably, the curvature of the transition surface 273 on adjacent sides of the upper and lower portions 292, 294 are the same. A seamless transition therefore is achieved between the upper and lower portions of the case.

As best illustrated in FIGS. 4-5 and FIGS. 9-12, the cases 200, 500 are generally formed of a multilayered molded construction that includes two layers 300, 400 that are co-molded together to form a unitary integral case construct. The first layer 300 is formed of relatively more rigid or harder material than the second layer 400, which defines the mobile device cavity 470 and forms the hinge 490. Various aspects of these layers and their inter-relationship, construction and manufacture are described in more detail.

Figure 4:
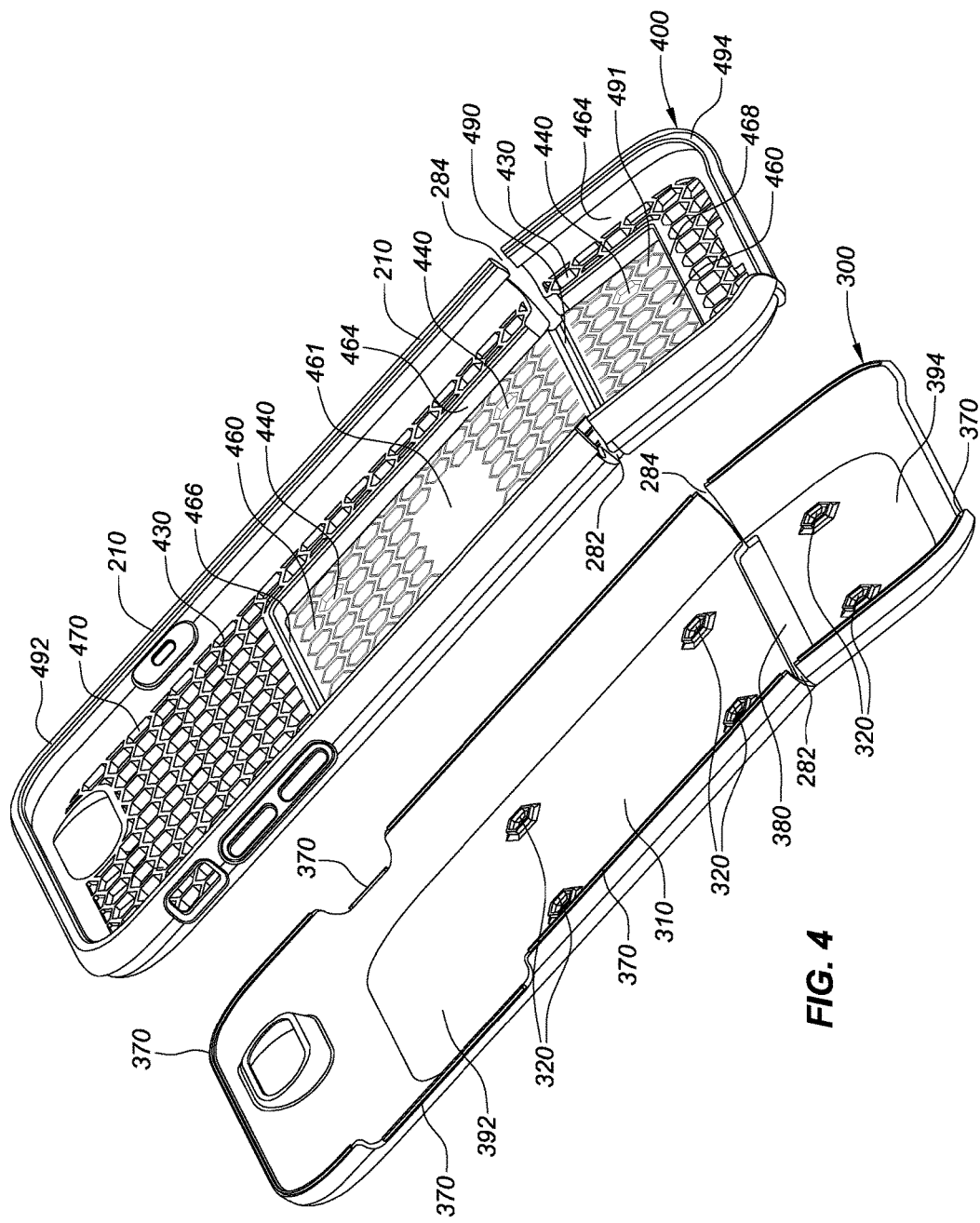
FIGS. 4-5 are front and back face perspective exploded views, respectively, of the protective case illustrated in FIG. 2 showing the two component layers of the case separated from one another to better illustrate the molded construction and configuration of each of the layers and their relative configuration to one another.
Figure 5:
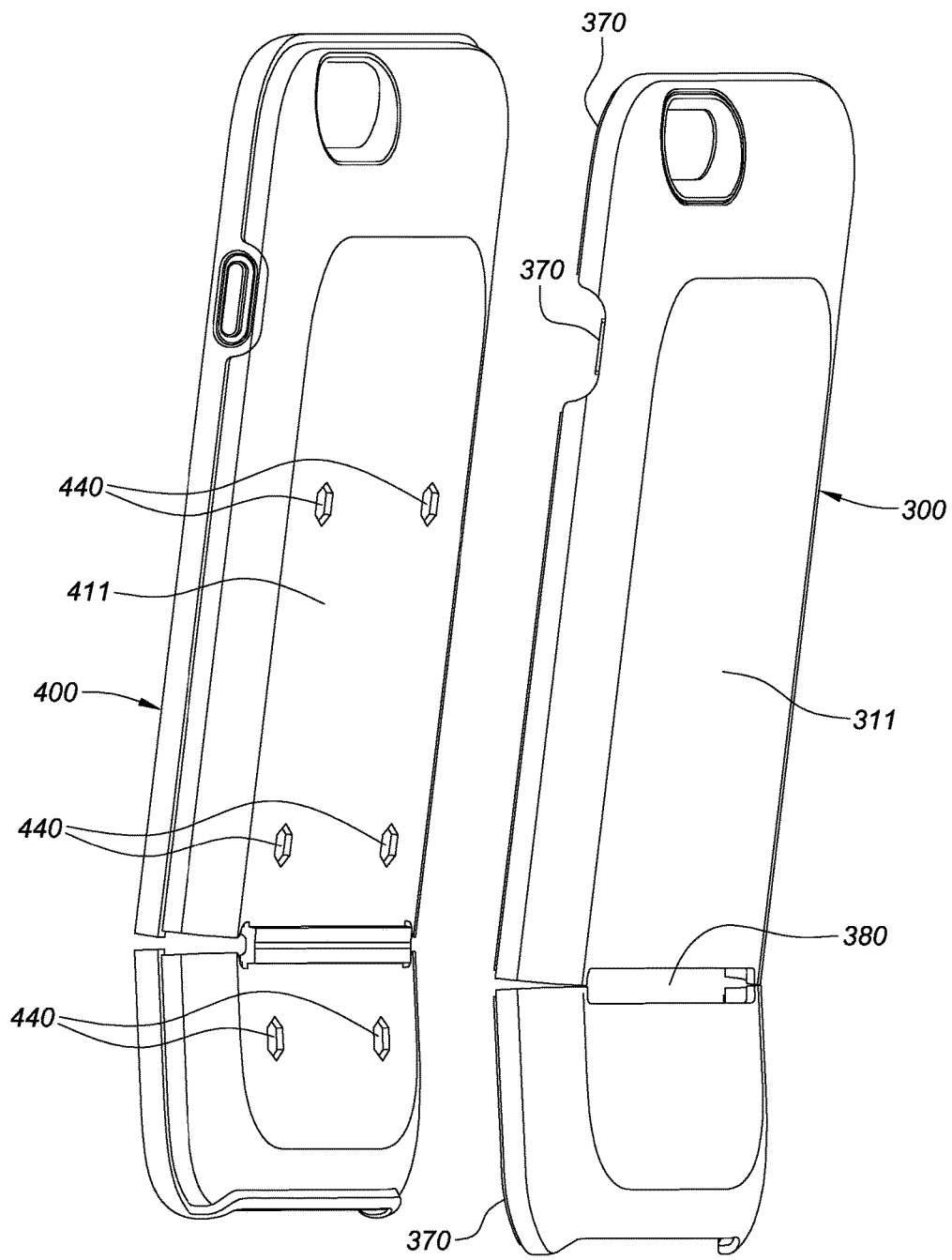
Figure 6A:
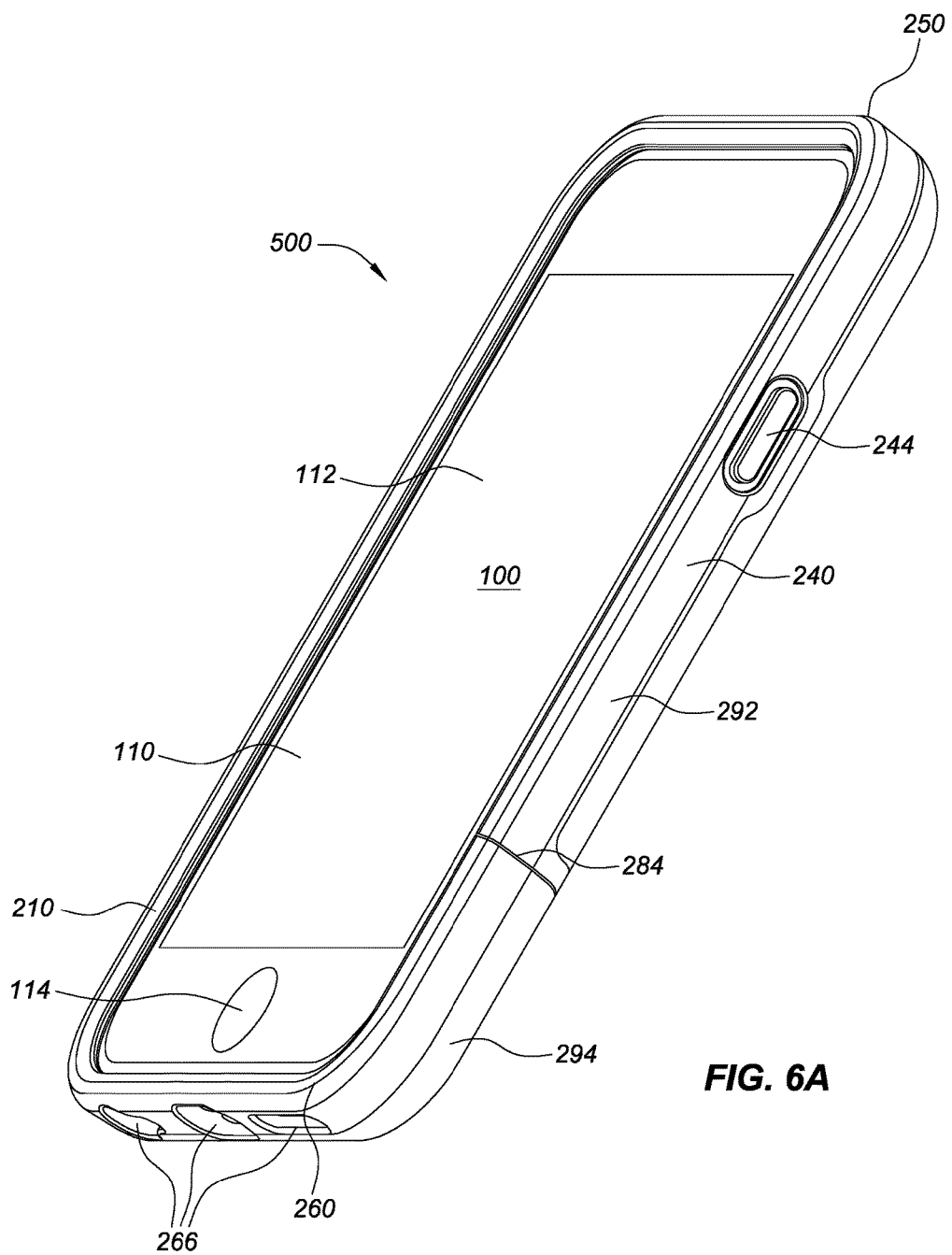
FIGS. 6A and 6B are front and rear perspective views, respectively, of another embodiment of the protective case for a mobile device with the mobile device received within the case and lower portion rotated and attached to the lower portion of the mobile device. The mobile device depicted, for which the illustrated embodiment of the case is particularly configured to receive, is an Apple iPhone 6® mobile phone.
Figure 6B:
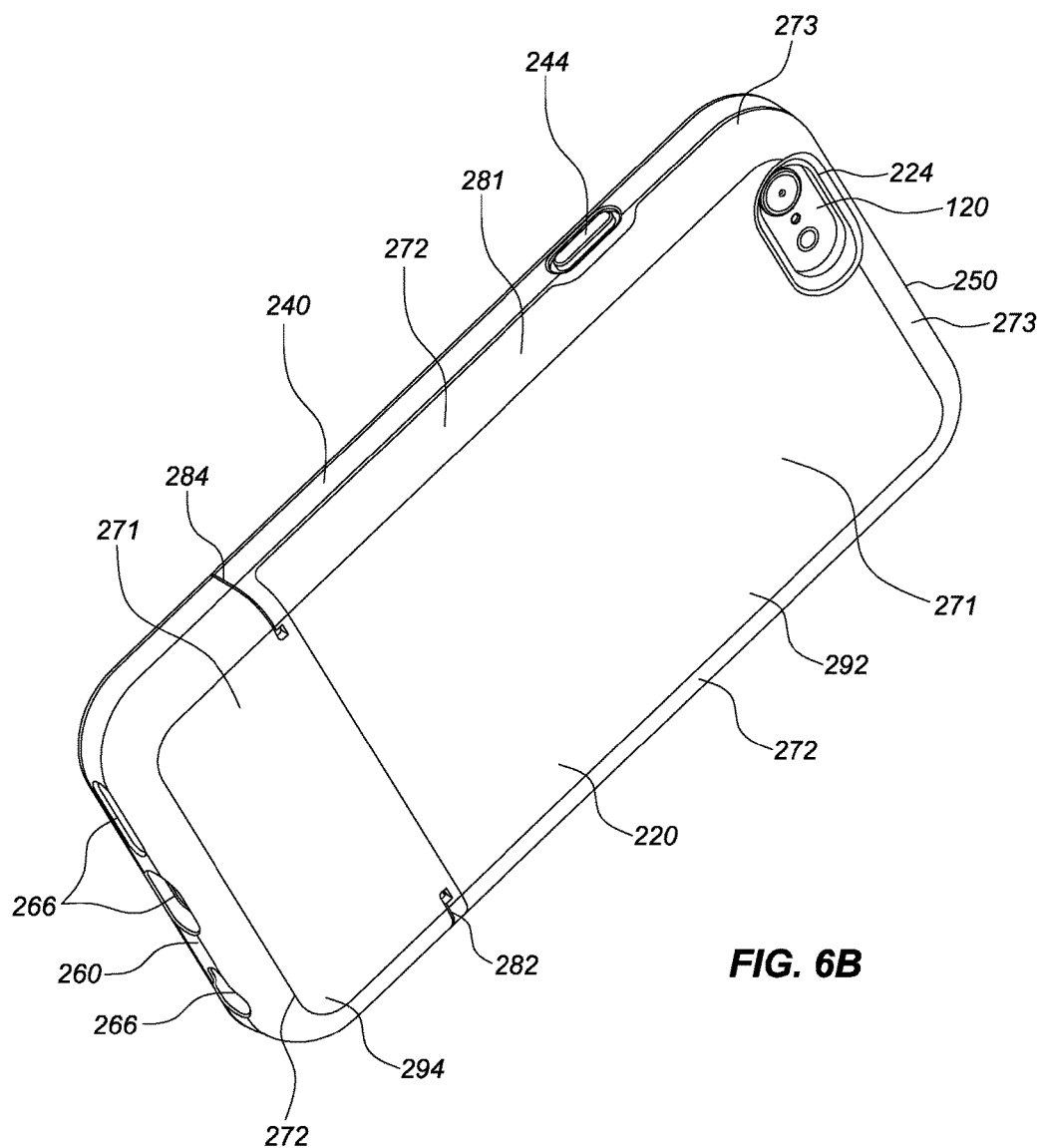
Figure 7:
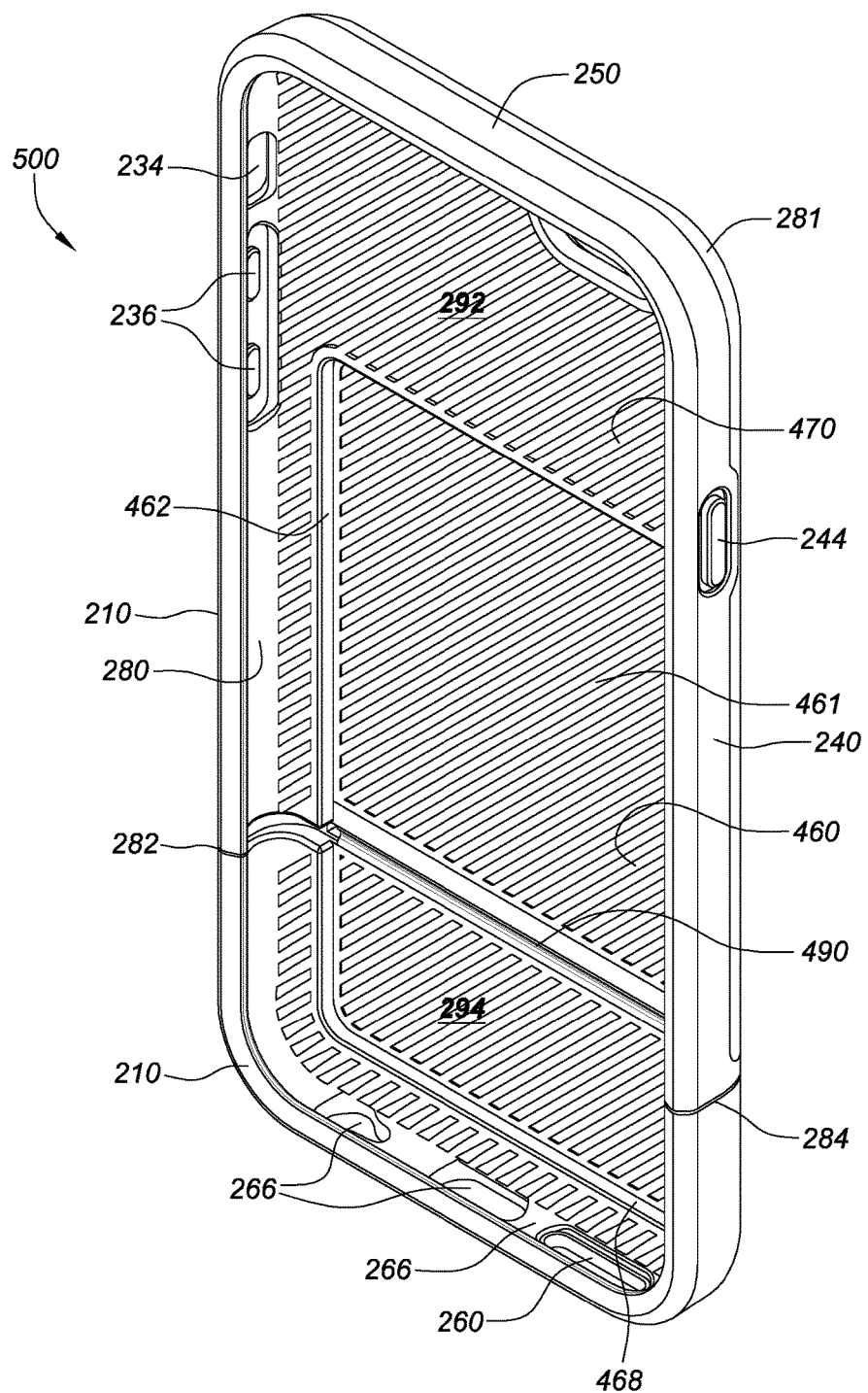
FIG. 7 is a perspective view of a protective case of FIG. 6 with the mobile device removed from the case to allow greater visibility into the construction and interior surface that defines the device cavity or compartment and the storage cavity residing underneath.
Figure 8A:
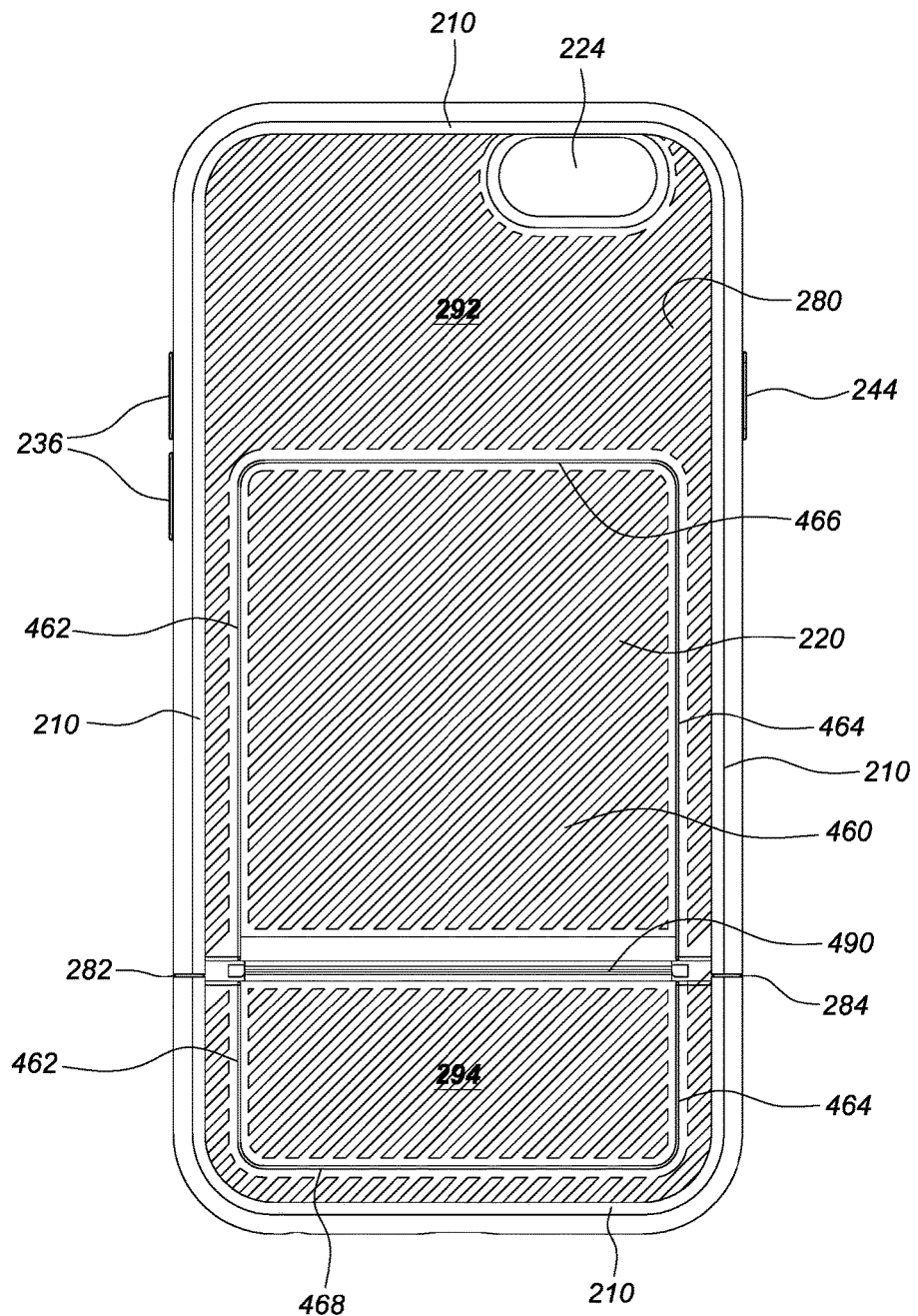
FIGS. 8A-8F are front face, back face, left side, right side, top side and bottom side views of the protective case of FIG. 7 that provide additional views of the structure and construction of the case from each side.
Figure 8B:
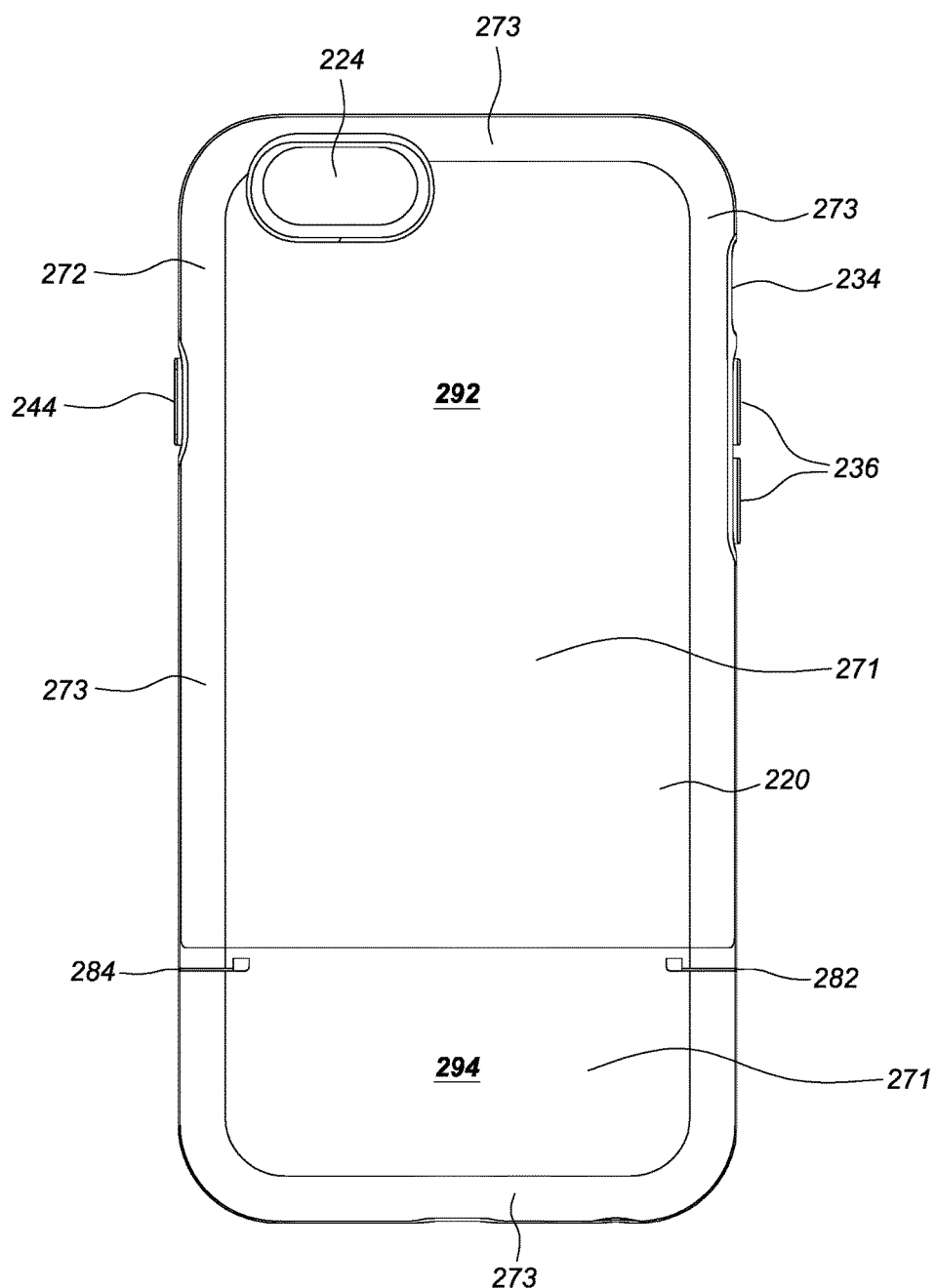
Figure 8C:
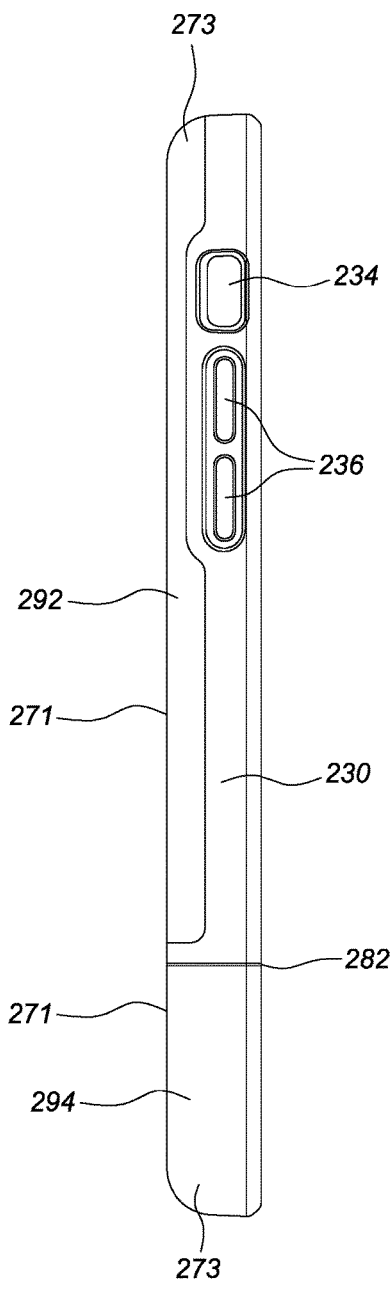
Figure 8D:
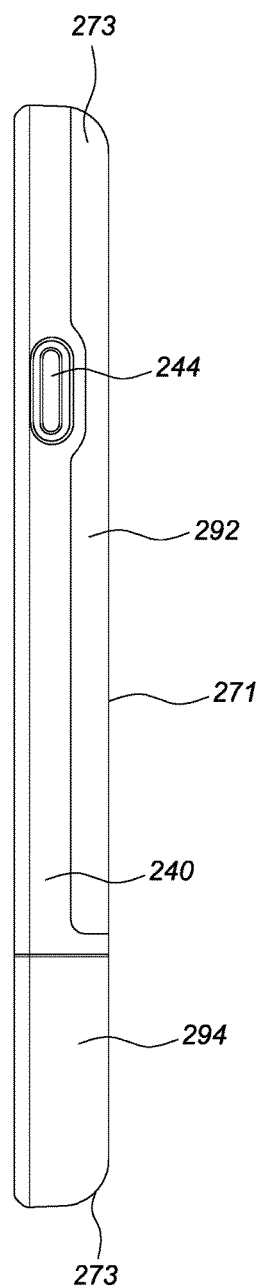
Figure 8E:
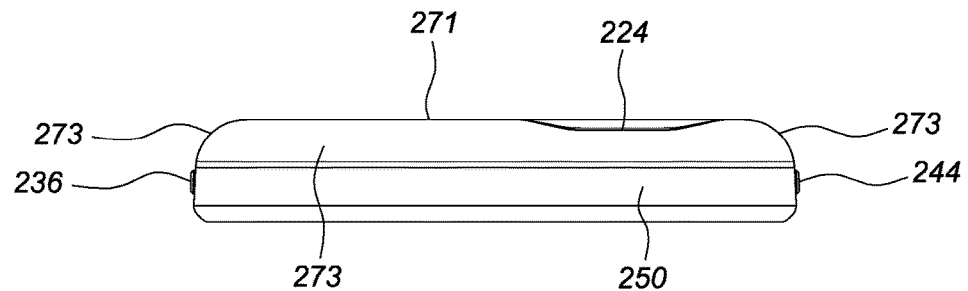
Figure 8F:
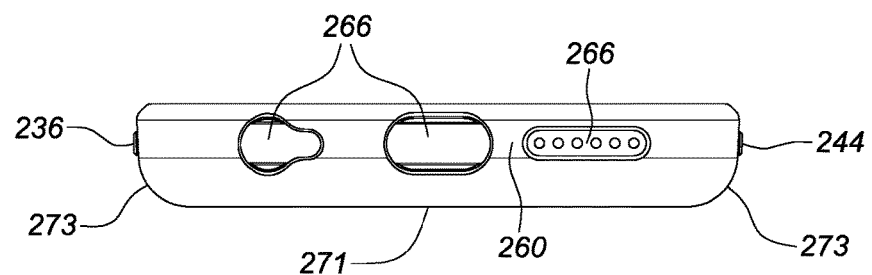
Figure 9:
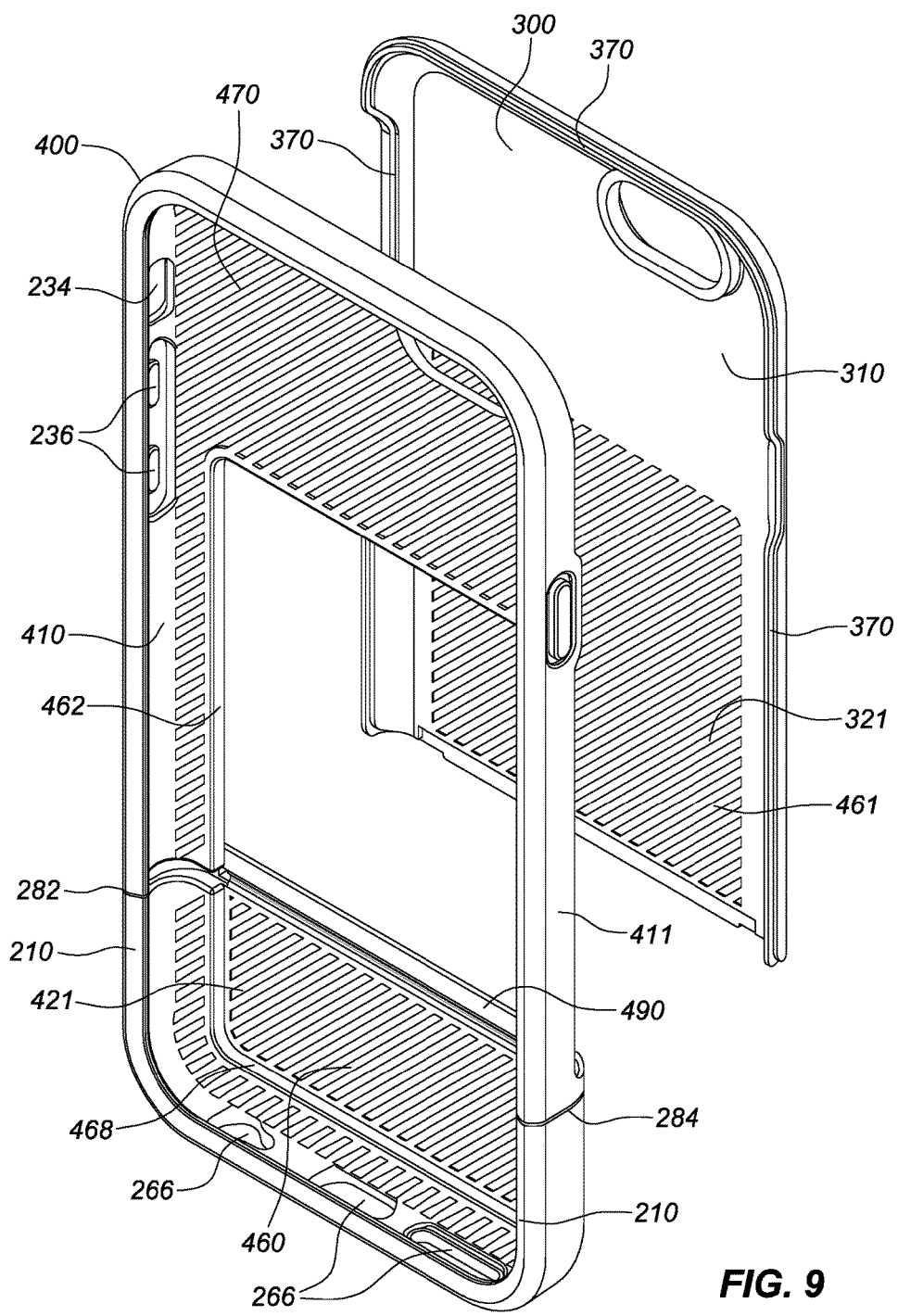
FIGS. 9-12 are front face perspective, right side, and back-right and back-left face perspective views, respectively, of the protective case illustrated in FIG. 7 showing the two component layers of the case separated from one another to better illustrate the molded construction and configuration of each of the layers and their relative configuration to one another.
Figure 10:
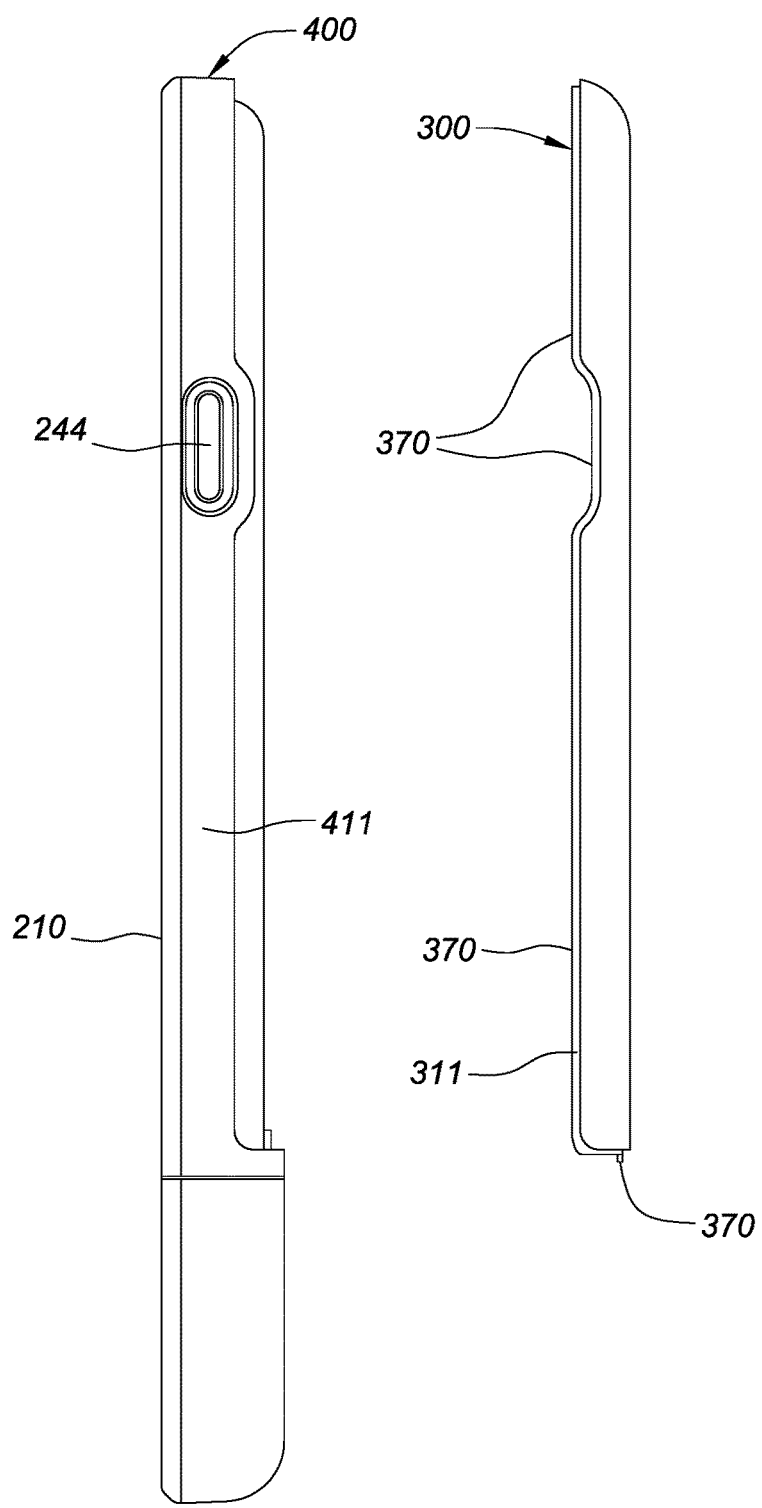
Figure 11:
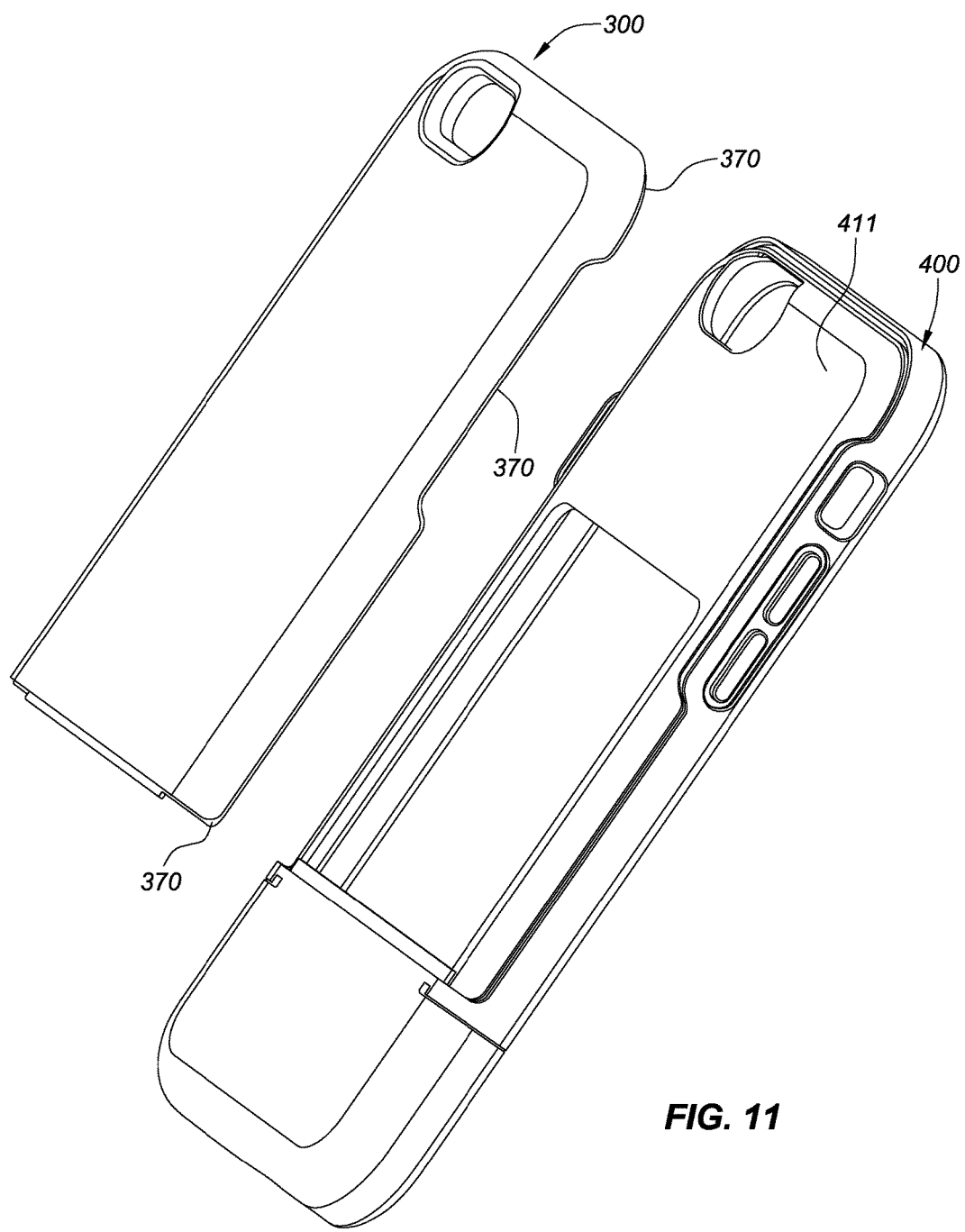
Figure 12:
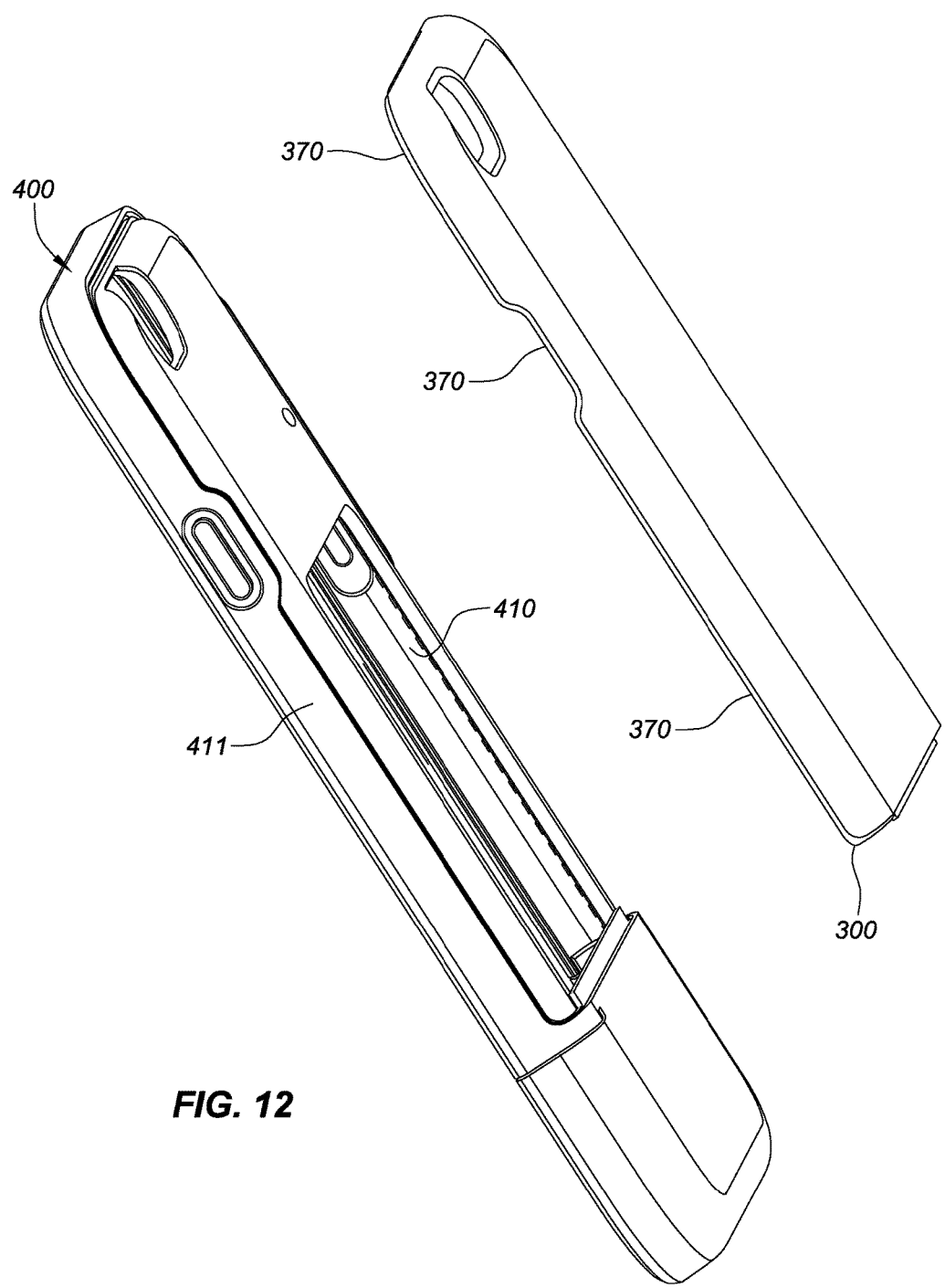

As best illustrated in FIGS. 4-5 for case 200 and FIGS. 9-12 for case 500, the first layer 300 is defined by first inner and outer surfaces 310, 311, respectively. In the case 200, the first layer 300 is dimensioned to substantially cover the entire back face 120 of the mobile device 100 and is configured to extend to the perimeter of the mobile device 100 on all sides of the mobile device 100. In the case 500, the first layer 300 is dimensioned to cover the only a portion of the back face 120 of the mobile device 100 corresponding to the upper portion 292 of the case 500 so as to be configured to extend to the perimeter of the mobile device 100 on the top, right and left sides 150, 140, 130 of the mobile device 100. The perimeter of the mobile device 100 may be defined by the intersection of the sides (e.g., 130, 140, 150 and 160) and the back face of the mobile device 100. In the illustrated implementations, the first layer 300 also forms lower regions of one or more of the left, right, top and bottom side walls 230, 240, 250, 260 of the case and includes openings for the control buttons, ports, and the camera window etc., previously described.

In the case 200 illustrated in FIGS. 1-5, the first inner surface 310 of the first layer 300 also includes a first plurality of protrusions 320 extending generally in a direction away from the outer surface 311 of the first layer 300. The apertures are configured to reside within correspondingly shaped openings or apertures 440 in the co-molded second layer 400 and may provide greater integration between the first and second layers. The first layer 300 forms separate upper and lower parts 392, 394 that correspond to the upper and lower portions 292, 294 of the case 200. A gap 380 is provided between the upper and lower parts 392, 394 and their interfacing edges to provide space for the hinge 490 to be co-molded there-between.

In the case 500 illustrated in FIGS. 6-12, the first inner surface 310 of the first layer 300 includes a ribbed or textured surface 321 that forms the back wall boundary 461 of the storage compartment cavity 460. The first layer 300 forms only an upper part 392 that corresponds to the upper portions 292 of the case 500.

The upper extent of the perimeter of the first layer 300 of both cases 200, 500 includes a small tab 370, around which the second layer 400 is molded. The tabs 370 are configured to reside on all sides of the first layer 300 and in the control button openings. Tab 370 may also be provided at the regions of the upper and/or lower parts 392, 394 of the first layer 300 that are configured to be molded to the hinge 490. Thus tabs 370 may be provided at any interfacing region on the first layer 300 that is configured to be co-molded to a second layer. The tabs 370 may assist in integration between the first and second layers 300, 400. The tabs 170 may include apertures or holes extending there through to better facilitate the integration by allowing the second layer 400 to extend through those holes during co-molding and thereby better anchor the second layer 400 to the first layer 300.

The second layer 400 is defined by second inner and outer surfaces 410, 411 respectively. The second layer 400 forms the interior surface of the mobile device cavity 470, the upper regions of the side walls 230, 240, 250, 260 and the front face wall 210. The second layer is dimensioned to cover all or some of the back face 120 of the mobile device 100 and extend around the perimeter of the mobile device 100 at the back face boundary defined by the intersection of the sides (e.g., 130, 140, 150 and 160) and the back face of the mobile device 100. The second layer also forms the hinge 490 that connects the upper and lower portions 292, 294 of the case.

In the case 200 illustrated in FIGS. 1-5, the second layer 400 covers the entire back face of the mobile device 100 and includes an elevated pattern of interconnected walls 430 extending from the second inner surface 410 a height above and in a direction away from the second outer surface 411. While the pattern of walls 430 in the second layer 400 is illustrated as being interconnected and elevated, it should be understood that the walls may be disconnected at one or more locations or in discrete regions. Also, while the honeycomb pattern of walls 430 are illustrated as having a generally uniform height or elevation, it should be understood that the walls 430 may have differing heights at discrete regions within the pattern or within or at specific walls or wall segments within the pattern of walls 430. Thus, for example, while the pattern of elevated interconnected walls 430 illustrated employ a repeating hexagonal external and internal shape, it should be understood that other shapes such as a square, octagon, pentagon, rectangle, triangle, circle, hexagon or heptagon or combination thereof may be employed in a repeating and/or random pattern with varying density in number from one region relative to another.

Also included in the second layer 400 of case 200 is a plurality of apertures 440 extending into the second outer surface 411, such that one or more of the apertures 440 are dimensioned and positioned to surround and be in contact with one or more of the protrusions 320 of the first layer 300. The second layer 400 also forms the storage compartment cavity 460 and each of the boundary walls 461, 462, 464, 468 and the adjacent wall structures thereto. Thus, in case 200, the entire interior surface 280 of the case 200 is formed by the softer second layer 400.

In the case 500 illustrated in FIGS. 6-12, the second layer 400 covers a portion of the back face of the mobile device 100 and includes an elevated pattern of ribbed or textured walls 421 extending from the second inner surface 410 a height above and in a direction away from the second outer surface 411. Like the walls 430, the ribs walls 421 can provide additional impact zones to cushion the mobile device when impact as a result of being dropped or the like. The second layer 400 in case 500 also forms the left, right, top and bottom boundary walls 462, 464, 468 that define the storage compartment 460 and the adjacent wall structures thereto. The bottom boundary wall 461 of the storage compartment 460, however, is defined by the first layer 300. The entire interior surface 280 of the case 200 that defines the mobile device cavity 470 is, therefore, formed by the softer second layer 400 in case 500. Unlike the case 200, however, the second layer 400 of case 500 forms the entirety of the lower portion 294 of the case 500, including the back face wall 220 of the lower portion 294.

While the cases 200, 500 illustrate specific implementations of the teachings herein, it should be understood that the first and second layers 300, 400 may be modified in configuration and may individually or in combination cover more or less of the back face of the mobile device 100 and may be configured individually or in combination to extend to or around the more or less of the perimeter of the mobile device 100 at the back face boundary.

Also while the first and second layers 300, 400 are preferably co-molded to form an integrated construction, it should be understood that it is contemplated that only portions of one or more of the layers may be co-molded, or each of the layers may be separately formed and mechanically attached to one another by clips, snaps or latches between each of the components or between for example the third layer and the first layer. A combination of co-molding and mechanical attachment of the layers or portions thereof may also be employed. In a fully integrated or co-molded construction the case 200 would be properly dimensioned and have sufficient flexibility to allow the user to insert and remove the mobile device 100 without damage to the case 200.

The materials that form the layers may be selected based on their hardness. For example, the first layer 300 may be made of a first material that has a first hardness, the second layer 400 may be made of a second material that has a second hardness that is different from the first layer. In a preferred implementation, the first hardness is greater than the second hardness.

The first and second layers 300, 400 may be formed of a composition comprised of one or more materials including but not limited to polycarbonate; thermoplastic urethane (TPU), thermoplastic elastomer (TPE), acrylonitrile butadiene styrene (ABS), nylon, metal, silicone rubber, or any combination thereof. For example, the first layer 300, which is the harder of the two layers, may be formed of a composition comprised of polycarbonate, a combination of polycarbonate and ABS, nylon, fiber reinforced plastic, and/or metal. The second layer 400, which is the softer of the three layers, may be formed for example of a composition comprised of TPE, silicone rubber, or combination thereof or other suitable materials. The second layer may be an elastic material.

The first layer 300 may have a Shore A durometer hardness that is 50% or more greater than the second layer 500, 40% or more greater than the second layer 500, 30% or more greater than the second layer, 20% or more greater than the second layer, or 10% or more greater than the second layer all +/−5% as measured using the American Society for Testing and Materials (ASTM) standard D2240. The first layer 300 may have a Shore A durometer hardness of 100 +/−15, 100 +/−10, or 100 +/−5, or 100 as measured using the American Society for Testing and Materials (ASTM) standard D2240. The second layer 400 may have a Shore A durometer hardness of 45 +/−15, 45 +/−10, 45 +/−5, or 45 as measured using the American Society for Testing and Materials (ASTM) standard D2240. It should be understood that the two layers may have a Shore A hardness that is comprised of any combination of hardness described above consistent with the teachings herein.

The case 200 is configured and constructed with sufficient flexibility to allow the user to install and remove the mobile device 100 within the case without damaging the case or the mobile device. The flexibility may be implemented via the construction materials employed and the configuration of the layers or components. Insertion may be facilitated either directly through the more flexible front face wall 220 formed by the softer second layer 400 or by rotating the lower portion 294 backward about the hinge 490 and sliding the mobile device into the mobile device cavity 470 of the case and then rotating and fitting the lower portion 294 about the bottom end region of the inserted mobile device 100. Rotating the hinge lower portion 294 backward also allows access to the storage compartment 460 concealed in the back face wall 220, such that credit cards or the like can be slid in and out through the hinged lower portion 294, which effectively serves as a door to the storage compartment 460.

An additional decorative finishing layer may be included on the external surface of one or both of the upper and lower portions to provide additional flexibility in achieving the desired finish. For example, an in-mold-labeling (IML) layer that is textured and/or colored with patterns or graphics to provide a desired finish such as the look of leather or metal or other desired finish may be included during the manufacturing process. In the case 500, for example, an IML layer may overlay the back face wall 220 of the upper portion 292. In the case 200, for example, an IML layer may overlay the back face wall 220 of the upper and/or lower portion 292, 294.

Manufacturing steps for the cases disclosed herein may, for example, include: (1) molding a first rigid layer in a mold that is configured to define the exterior shape of a first layer, the first layer comprising a back wall and sidewalls of only an upper portion of the case or of both an upper and lower portion of the case; (2) co-molding a second softer layer to the first rigid layer in a mold that is configured to define the exterior shape of the second layer, the second softer layer forming a hinge component between the upper and lower portion of the case and comprising the interior surfaces of both the back wall and sidewalls of both the upper and lower portion of the case; (3) imparting a separation between the upper portion and lower portion of the case by molding and/or mechanically cutting the walls between the upper and lower portions adjacent to opposing ends of the hinge.

The exterior configuration and construction of the case and components thereof as described in the written specification and drawings may be further incorporated into the foregoing manufacturing and molding process. An IML type finish may be included in the manufacturing process during molding. The manufacturing process may also include applying a spray or dipped coating over the molded case construct. For example, a latex based outer coating such as those marketed as Soft-Touch coatings or other lipophobic or oleophobic coatings may be applied to the molded case to mitigate against fingerprints and provide a desirable feel to the user.

Each of the foregoing and various aspects, together with those set forth in the claims and described in connection with the embodiments of the protective cases summarized above or otherwise disclosed herein including the drawings may be combined as claim limitations for a device, apparatus, system, method of manufacture, and/or use.

Although the various inventive aspects are herein disclosed in the context of certain preferred embodiments, implementations, and examples, it should be understood by those skilled in the art that the present invention extends beyond the specifically disclosed embodiments to other alternative embodiments and/or uses of the invention and obvious modifications and equivalents thereof. In addition, while a number of variations of the various aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment.

What is claimed is:

1. A protective case for a mobile device configured to be user removable from said mobile device, said protective case comprising:
    an upper portion formed from a first layer of a first material enclosed within a second layer of a second material;
    a lower portion formed from at least the second material, the lower portion being hingedly attached to the upper portion by a hinge region formed from the second material positioned between the upper portion and the lower portion, the hinge region enabling the lower portion to pivot relative to the upper portion;
    wherein the interior surfaces of the upper portion and the lower portion together define a mobile device cavity and a separate storage compartment, the mobile device cavity being configured to receive and retain a mobile device and the storage compartment being configured to store items between the mobile device cavity and the upper and lower portions;
    wherein the first layer and the second layer are co-molded to one another, and wherein the first material is harder than the second material;
    wherein the upper portion has a left sidewall and a right sidewall, each of the sidewalls including an upper region entirely formed from the second material and a lower region formed from the first material enclosed within the second material; and
    wherein access to the storage compartment is provided by rotating the lower portion, at the hinge region, over the upper portion.

2. The protective case of claim 1 further comprising a flat surface region opposite the storage compartment that extends across the upper and lower portions and a curved transition region that continuously extends to the perimeter of the case.

3. The protective case of claim 2, wherein the flat exterior region is configured to extend beyond the perimeter of the storage compartment.

4. The protective case of claim 1, wherein the lower portion is formed from the first and second co-molded layers.

5. The protective case of claim 1, wherein the interior surface of the case further includes a pattern of elevated support structures.

6. The protective case of claim 5, wherein the lower portion further comprises a third layer of a third material enclosed within the second material.

7. The protective case of claim 6, wherein the third layer of the lower portion is not directly physically connected to the first layer of the upper portion.

8. The protective case of claim 7, wherein the upper portion and lower portion are separated by a gap.

9. The protective case of claim 8, wherein the hinge region is located in the gap between the upper portion and the lower portion.

10. The protective case of claim 1, wherein the lower portion further comprises a third layer of a third material enclosed within the second material.

11. The protective case of claim 10, wherein the third material is the first material.

12. The protective case of claim 10, wherein the third layer of the lower portion is not directly physically connected to the first layer of the upper portion.

13. The protective case of claim 12, wherein the upper portion and lower portion are separated by a gap.

14. The protective case of claim 13, wherein the hinge region is located in the gap between the upper portion and the lower portion.

15. A protective case for a mobile device configured to be user removable from said mobile device, said protective case comprising:
    an upper portion formed from a first layer of a first material enclosed within a second layer of a second material;
    a lower portion formed from at least the second material, the lower portion being hingedly attached to the upper portion by a hinge region formed from the second material positioned between the upper portion and the lower portion, the hinge region enabling the lower portion to pivot relative to the upper portion;
    wherein the interior surfaces of the upper portion and the lower portion together define a mobile device cavity and a separate storage compartment, the mobile device cavity being configured to receive and retain a mobile device and the storage compartment being configured to store items between the mobile device cavity and the upper and lower portions;
    wherein the first layer and the second layer are co-molded to one another, and wherein the first material is harder than the second material;

wherein the upper portion has a left sidewall and a right sidewall, each of the sidewalls including an upper region entirely formed from the second material and a lower region formed from the first material enclosed within the second material;

wherein access to the storage compartment is provided by rotating the lower portion, at the hinge region, over the upper portion; and wherein the interior surface of the case further includes a pattern of elevated support structures.

16. The protective case of claim 15, wherein the lower portion further comprises a third layer of a third material enclosed within the second material.

17. The protective case of claim 16, wherein the third material is the first material.

18. The protective case of claim 16, wherein the third layer of the lower portion is not directly physically connected to the first layer of the upper portion.

19. The protective case of claim 18, wherein the upper portion and lower portion are separated by a gap.

20. The protective case of claim 19, wherein the hinge region is located in the gap between the upper portion and the lower portion.

\* \* \* \* \*